(12) United States Patent
Kim

(10) Patent No.: US 11,263,513 B2
(45) Date of Patent: Mar. 1, 2022

(54) METHOD AND SYSTEM FOR BIT QUANTIZATION OF ARTIFICIAL NEURAL NETWORK

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/254,039

(22) PCT Filed: Feb. 21, 2020

(86) PCT No.: PCT/KR2020/002559
§ 371 (c)(1),
(2) Date: Dec. 18, 2020

(87) PCT Pub. No.: WO2020/175862
PCT Pub. Date: Sep. 3, 2020

(65) Prior Publication Data
US 2021/0264232 A1 Aug. 26, 2021

(30) Foreign Application Priority Data

Feb. 25, 2019 (KR) .................. 10-2019-0022047
Jun. 7, 2019 (KR) .................. 10-2019-0067585

(51) Int. Cl.
*G06N 3/04* (2006.01)
*G06N 3/063* (2006.01)
*G06N 20/00* (2019.01)

(52) U.S. Cl.
CPC .............. *G06N 3/04* (2013.01); *G06N 3/063* (2013.01); *G06N 20/00* (2019.01)

(58) Field of Classification Search
CPC .......... G06N 3/04; G06N 3/063; G06N 3/082
See application file for complete search history.

(56) References Cited

U.S. PATENT DOCUMENTS

| 9,916,531 | B1 | 3/2018 | Zizkovic et al. |
| 2016/0328647 | A1 | 11/2016 | Lin et al. |
| 2019/0050710 | A1 | 2/2019 | Wang et al. |

FOREIGN PATENT DOCUMENTS

| KR | 10-2018-0082344 A | 7/2018 |
| KR | 10-2018-0129211 A | 12/2018 |
| KR | 10-2019-0014900 A | 2/2019 |

OTHER PUBLICATIONS

Zhou, Yiren et al.; Adaptive Quantization for Deep Neural Network; arXiv:1712.01048v1 [cs.LG] Dec. 4, 2017; pp. 1-14. (Year: 2017).*

(Continued)

*Primary Examiner* — Stanley K. Hill
(74) *Attorney, Agent, or Firm* — Fenwick & West LLP

(57) ABSTRACT

The present disclosure provides a bit quantization method of an artificial neural network. This method may include: (a) of selecting one parameter or one parameter group to be quantized in the artificial neural network; (b) a bit quantizing to reduce the data representation size for the selected parameter or parameter group to a unit of bits; (c) of determining whether the accuracy of the artificial neural network is equal to or greater than a predetermined target value; and (d) repeating steps (a) to (c) when the accuracy of the artificial neural network is equal to or greater than the target value.

13 Claims, 17 Drawing Sheets

(56) References Cited

OTHER PUBLICATIONS

Guo, Yunhui et al.; A Survey on Methods and Theories of Quantized Neural Networks; arXiv:1808.04752v2 [cs.LG] Dec. 16, 2018; 17 pages. (Year: 2018).*
PCT International Search Report and Written Opinion, PCT Application No. PCT/KR2020/002559, dated May 26, 2020, 14 pages (with English translation of PCT International Search Report).
Zhou, Y. et al., "Adaptive Quantization for Deep Neural Network," The Thirty-Second AAAI Conference on Artificial Intelligence (AAAI-18), Feb. 2018, pp. 4593-4604, [Online] [Retrieved on May 22, 2020] Retrieved from the Internet<URL:https://www.aaai.org/ocs/index.php/AAAI/AAAI18/paper/viewFile/16248/16774>.
Korean Intellectual Property Office, Office Action, KR Patent Application No. 10-2021-0019469, dated May 11, 2021, 20 pages.

* cited by examiner

[AMOUNT OF COMPUTATION PER LAYER OF CONVOLUTION ARTIFICIAL NEURAL NETWORK OF VGG-16 MODEL INCLUDING 16 LAYERS]

[NUMBER OF BIT PER LAYER, AFTER APPLYING FORWARD QUANTIZATION REGARDING CONVOLUTION ARTIFICIAL NEURAL NETWORK OF VGG-16 MODEL INCLUDING 16 LAYERS]

[NUMBER OF BIT PER LAYER, AFTER APPLYING BACKWARD QUANTIZATION REGARDING CONVOLUTION ARTIFICIAL NEURAL NETWORK OF VGG-16 MODEL INCLUDING 16 LAYERS]

[NUMBER OF BIT PER LAYER, AFTER APPLYING HIGH COMPUTATION QUANTIZATION REGARDING CONVOLUTION ARTIFICIAL NEURAL NETWORK OF VGG-16 MODEL INCLUDING 16 LAYERS]

[NUMBER OF BIT PER LAYER, AFTER APPLYING LOW COMPUTATION QUANTIZATION REGARDING CONVOLUTION ARTIFICIAL NEURAL NETWORK OF VGG-16 MODEL INCLUDING 16 LAYERS]

METHOD AND SYSTEM FOR BIT QUANTIZATION OF ARTIFICIAL NEURAL NETWORK

TECHNICAL FIELD

The present disclosure relates to a method and system for bit quantization of an artificial neural network, and more particularly, to a method and system for bit quantization capable of reducing memory usage while maintaining substantial accuracy of an artificial neural network.

BACKGROUND ART

An artificial neural network is a computer structure modeling a biological brain. In an artificial neural network, nodes corresponding to neurons in the brain are interconnected, and the strength of synaptic coupling between neurons is expressed as a weight. The artificial neural network constructs a model with a given problem-solving ability by changing the strength of synaptic coupling between nodes through training by artificial neurons (nodes).

The artificial neural network may refer to a multi-layered perceptron, a kind of a feedforward neural network, in a narrow sense, however, is not limited thereto, and various types of neural networks, such as a radial basis function network, a self-organizing network, and a recurrent neural network, may be included.

Recently, a multi-layered deep neural network is widely used as a technology for image recognition, and a representative example of a multi-layered deep neural network is a convolutional neural network (CNN). In the case of a general multi-layered feedforward neural network, input data is limited to a one-dimensional form, but if an image data consisting of two to three dimensions is flattened into one-dimensional data, spatial information is lost, and it can be difficult to train the neural network while maintaining the spatial information of an image. However, the convolutional neural network can train visual information while maintaining 2D or 3D spatial information.

Specifically, convolutional neural network is effective in recognizing patterns of visual data as it includes a Max-Pooling process that effectively recognizes features of adjacent images while maintaining spatial information of images, and collects and reinforces features of extracted images. However, a deep neural network having a multi-layered structure such as a convolutional neural network uses a deep layer structure to provide high recognition performance, but its structure is very complex and requires a large amount of computation and a large amount of memory. In a multi-layered deep neural network, most of the operations that occur internally are executed using multiplication and addition or accumulation, and the number of connections between nodes in the artificial neural network is large and parameters that require multiplication e.g., weight data, feature Map data, activation map data, and extra are large, so a large amount of computation is required in the training process or recognition process.

DETAILED DESCRIPTION OF THE PRESENT INVENTION

Technical Problems

As discussed above, a large amount of computation and memory are required in the training and recognition process of a multi-layered deep neural network such as a convolutional neural network. As a method of reducing the amount of computation and memory of a multi-layered deep neural network, a bit quantization method that reduces the data representation size of parameters used in the computation of the artificial neural network in bit units may be used. In the conventional bit quantization method, uniform bit quantization is used, which quantizes all parameters of an artificial neural network with the same number of bits, and the conventional uniform bit quantization method has a problem in that it does not accurately reflect the effect of changing the number of bits for each parameter used in an artificial neural network on overall performance.

The embodiments disclosed in the present disclosure is to provide a method and system for quantizing each parameter data configuring an artificial neural network or parameter data grouped according to a specific criterion to a specific number of bits so that the artificial intelligence accuracy can be maintained while improving the overall performance of the artificial neural network.

Means for Solving the Problems

According to an embodiment of the present disclosure, a method for quantizing bits of an artificial neural network is provided. The method includes the steps of: (a) selecting at least one parameter among a plurality of parameters used in the artificial neural network; (b) a bit quantizing to reduce the size of data required for an operation on the selected parameter to a unit of bits; (c) determining whether the accuracy of the artificial neural network is greater than or equal to a predetermined target value; (d) if the accuracy of the artificial neural network is greater than or equal to the target value, steps (b) to (c) are repeatedly executed for the parameter to further reduce the number of bits in the data representation of the parameter. In addition, this method further includes the steps of (e) if the accuracy of the artificial neural network is less than the target value, the number of bits of the parameter is restored to the number of bits when the accuracy of the artificial neural network is greater than the target value, and then repeating the steps from (a) to (d).

According to an embodiment of the present disclosure, a method for quantizing bits of an artificial neural network is provided. The method includes the steps of: (a) selecting at least one of the plurality of layers by a parameter selection module; (b) a bit quantizing to reduce a size of a data representation for a parameter of the selected layer to a unit of bits by a bit quantization module; (c) determining whether the accuracy of the artificial neural network is greater than or equal to a predetermined target value by an accuracy determination module; and (d) repeating steps from (a) to (c) when the accuracy of the artificial neural network is greater than or equal to the target value.

According to an embodiment of the present disclosure, a method for quantizing bits of an artificial neural network is provided. This method includes the step of: (a) selecting one or more data or data of one or more groups among weights, feature maps, and activation map data from the artificial neural network; (b) a bit quantizing to reduce a data representation size for the selected data to a unit of bits by a bit quantization module; (c) measuring whether the artificial intelligence accuracy of the artificial neural network is greater than or equal to a target value; and (d) repeating steps from (a) to (c) until there is no more data to be quantized among the data of the artificial neural network.

According to an embodiment of the present disclosure, a method for quantizing bits of an artificial neural network is provided. This method includes: training the artificial neural network according to one or more parameters of the artificial neural network; performing bit quantization on one or more parameters of the artificial neural network according to the method of bit quantization of the artificial neural network according to the embodiments; and training the artificial neural network according to one or more parameters of the artificial neural network on which the bit quantization was performed.

According to another embodiment of the present disclosure, a system for quantizing bits of an artificial neural network is provided. The system may include: a parameter selection module for selecting at least one parameter within the artificial neural network; a bit quantizing to reduce the size of the data representation of the selected parameter to a unit of bits; and an accuracy determination module that determines whether the accuracy of the artificial neural network is greater than or equal to a predetermined target value. If the accuracy of the artificial neural network is more than the target value, the accuracy determination module controls the parameter selection module and the bit quantization module to execute quantization so that each of the plurality of parameters has a minimum number of bits while maintaining the accuracy of the artificial neural network above the target value.

According to an embodiment of the present disclosure, a system for quantizing bits of an artificial neural network is provided. This system includes a parameter selection module for selecting at least one layer among a plurality of layers configuring the artificial neural network; a bit quantization module for reducing the size of the data representation for the parameter of the selected layer to a unit of bits; and an accuracy determination module for determining whether the accuracy of the artificial neural network is greater than or equal to a predetermined target value, and if the accuracy of the artificial neural network is equal to or greater than the target value, the accuracy determination module controls the parameter selection module and the bit quantization module to perform bit quantization for another layer among the plurality of layers, and the bit quantization module sets n bits (where n is an integer of n>0) for all weights of the plurality of layers, and sets m bits (where m is an integer of m>0) for output data of the plurality of layers.

According to an embodiment of the present disclosure, a system for quantizing bits of an artificial neural network is provided. The system comprises: a parameter selection module for selecting at least one layer from a plurality of layers configuring the artificial neural network; a bit quantization module for reducing the size of the data representation for the parameter of the selected layer to a unit of bits; and an accuracy determination module that determines whether the accuracy of the artificial neural network is greater than or equal to a predetermined target value, wherein when the accuracy of the artificial neural network is greater than or equal to the target value, the accuracy determination module controls the parameter selection module and the bit quantization module to perform bit quantization for the other layer among the plurality of layers, and wherein the bit quantization module allocates n bits (where n is an integer of n>0) to weights of the plurality of layers and a output data, and sets a number of bits allocated to each of the plurality of layers differently.

According to an embodiment of the present disclosure, a system for quantizing bits of an artificial neural network is provided. The system comprises: a parameter selection module for selecting at least one layer from a plurality of layers configuring the artificial neural network; a bit quantization module for reducing the size of the data representation for the parameter of the selected layer to a unit of bits; and an accuracy determination module that determines whether the accuracy of the artificial neural network is greater than or equal to a predetermined target value, when the accuracy of the artificial neural network is greater than or equal to the target value, wherein the accuracy determination module controls the parameter selection module and the bit quantization module to perform bit quantization for an another layer among the plurality of layers, and wherein the bit quantization module individually and differently allocates weights of the plurality of layers and the number of bits of output data.

According to an embodiment of the present disclosure, a system for quantizing bits of an artificial neural network is provided. The system comprises: a parameter selection module for selecting at least one layer from a plurality of layers configuring the artificial neural network; a bit quantization module for reducing a size of a memory for storing the parameter of the selected layer to a unit of bits; and an accuracy determination module that determines whether the accuracy of the artificial neural network is greater than or equal to a predetermined target value, wherein when the accuracy of the artificial neural network is greater than or equal to the target value, the accuracy determination module controls the parameter selection module and the bit quantization module to perform bit quantization for an another layer among the plurality of layers, and wherein the bit quantization module allocates a different number of bits for each weight used in the plurality of layers.

According to an embodiment of the present disclosure, a system for quantizing bits of an artificial neural network is provided. The system comprises: a parameter selection module for selecting at least one layer from a plurality of layers configuring the artificial neural network; a bit quantization module for reducing the size of the data representation for the parameter of the selected layer to a unit of bits; and an accuracy determination module that determines whether the accuracy of the artificial neural network is equal to or greater than a predetermined target value, wherein when the accuracy of the artificial neural network is greater than or equal to the target value, the accuracy determination module controls the parameter selection module and the bit quantization module to perform bit quantization for an another layer among the plurality of layers, and wherein the bit quantization module individually allocates a different number of bits to a specific unit of output data output from the plurality of layers.

According to an embodiment of the present disclosure, a system for quantizing bits of an artificial neural network is provided. The system comprises: a parameter selection module for selecting at least one layer from a plurality of layers configuring the artificial neural network; a bit quantization module for reducing the size of the data representation for the parameter of the selected layer to a unit of bits; and an accuracy determination module that determines whether the accuracy of the artificial neural network is greater than or equal to a predetermined target value, wherein when the accuracy of the artificial neural network is greater than or equal to the target value, the accuracy determination module controls the parameter selection module and the bit quantization module to perform bit quantization for an another layer among the plurality of layers, and wherein the bit quantization module allocates different bits to individual values of output data output from the plurality of layers.

Effects of the Present Invention

According to various embodiments of the present disclosure, it is possible to improve overall operation performance by quantizing the number of bits of data required for an operation such as training or inference in an artificial neural network.

In addition, it is possible to implement an artificial neural network that does not deteriorate the accuracy of artificial intelligence while reducing hardware resources required to implement the artificial neural network and reducing power consumption and memory usage.

BRIEF DESCRIPTION OF THE DRAWINGS

Embodiments of the present disclosure will be described with reference to the accompanying drawings described below, where like reference numerals denote like elements, but are not limited thereto.

MODE FOR CARRYING OUT THE INVENTION

Figure 1:
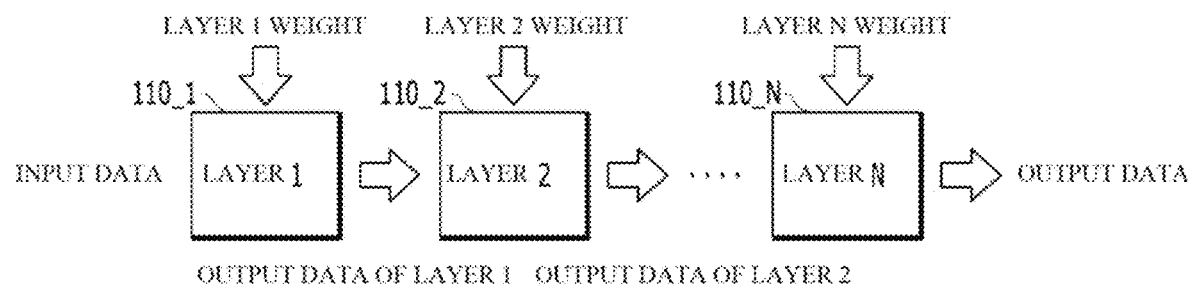
FIG. 1 is a diagram illustrating an example of an artificial neural network for obtaining output data for input data using a plurality of layers and a plurality of layer weights according to an embodiment of the present disclosure.

Hereinafter, with reference to the accompanying drawings, specific details for carrying out the present disclosure will be described in detail. However, in the following description, if there is a possibility that the subject matter of the present disclosure may be unnecessarily obscure, detailed descriptions of widely known functions or configurations may be omitted.

In the accompanying drawings, the same or corresponding elements are assigned the same reference numerals. In addition, in the description of the following embodiments, redundant descriptions of the same or corresponding elements may be omitted. However, even if description of an element is omitted, it is not intended that such element is not included in any embodiment.

In the present disclosure, "parameter" may mean one or more of an artificial neural network or weight data, feature map data, and activation map data of each layer configuring the artificial neural network. In addition, the "parameter" may mean an artificial neural network or each layer configuring an artificial neural network expressed by such data. In addition, in the present disclosure, "bit quantization" may mean an operation or operation for reducing the number of bits in a data representation representing a parameter or a group of parameters.

The present disclosure provides various embodiments of a quantization method and system for reducing a data representation size of a parameter used in a related operation to a unit of bits in order to reduce the computational, memory usage, and power consumption of digital hardware systems. In some embodiments, the bit quantization method and system of the present disclosure may reduce a size of a parameter used in an artificial neural network operation to a unit of bits. In general, data structures of 32-bit, 16-bit, or 8-bit units (for example, CPU, GPU, memory, cache, buffer, and the like), are used for computation of artificial neural networks. Accordingly, the quantization method and system of the present disclosure can reduce the size of a parameter used for calculating an artificial neural network to bits other than 32, 16, and 8 bits. Moreover, it is possible to individually and differently allocate a specific number of bits to each parameter or group of parameters of the artificial neural network.

In some embodiments, the bit quantization method and system of the present disclosure may set n bits, where n is an integer of n>0, for all weights for an artificial neural network model and m bits, where m is an integer of m>0, for output data of each layer.

In another embodiment, the bit quantization method and system of the present disclosure may allocate n bits to the weight and output data of each layer of the artificial neural network model, where n may be set to a different number for each layer.

In the other embodiment, the bit quantization method and system of the present disclosure allocates different bits to the weight and output data of each layer of the artificial neural network model, and moreover, a different number of bits may be allocated to each layer for a weight and an output feature map parameter in the corresponding layer.

The bit quantization method and system of the present disclosure can be applied to various kinds of artificial neural networks. For example, when the bit quantization method and system of the present disclosure is applied to a convolutional artificial neural network (CNN), different bits can be individually assigned to weight kernels used in each layer of this artificial neural network.

In another embodiment, the bit quantization method and system of the present disclosure can allocate different bits for each weight used in each layer of the multi-layered artificial neural network model, allocates individual bits to a specific unit of output data of each layer, or allocate different bits to individual values of the output data.

The bit quantization method and system according to various embodiments of the present disclosure described above may apply any one of the above-described embodiments to an artificial neural network model, but is not limited thereto, and one or more of these embodiments may be combined and applied to the artificial neural network model.

FIG. 1 is a diagram illustrating an example of an artificial neural network 100 that obtains output data for input data using a plurality of layers and a plurality of layer weights according to an embodiment of the present disclosure.

In general, a multi-layered artificial neural network such as the artificial neural network 100 includes a statistical training algorithm implemented based on the structure of a biological neural network in machine learning technology and cognitive science, or a structure that executes the algorithm thereof. That is, in an artificial neural network 100, as in a biological neural network, nodes, which are artificial neurons that form a network by combining synapses, repeatedly adjust the weight of synapses, a machine learning model with problem solving ability can be created by training to reduce an error between the correct output corresponding to a specific input and the inferred output.

In one example, the artificial neural network 100 may be implemented as a multi-layer perceptron (MLP) composed of layers including one or more nodes and connections therebetween. However, the artificial neural network 100 according to the present embodiment is not limited to the structure of the MLP, and may be implemented using one of various artificial neural network structures having a multi-layer structure.

As shown in FIG. 1, when input data from the outside is provided, the artificial neural network 100 is configured to output the output data corresponding to the input data through a plurality of layers 110_1, 110_2, . . . , 110_N each composed of one or more nodes.

In general, the training method of the artificial neural network 100 includes a supervised learning method that trains to be optimized to solve a problem by inputting a teacher signal (correct answer), an unsupervised learning method that does not require a teacher signal, and a semi-supervised learning method that uses supervised learning and unsupervised learning together. The artificial neural network 100 shown in FIG. 1 uses at least one of a supervised learning method, an unsupervised learning method, and a semi-supervised learning method according to the user's selection. Thus, it is possible to train the artificial neural network 100 that generates output data.

Figure 2:
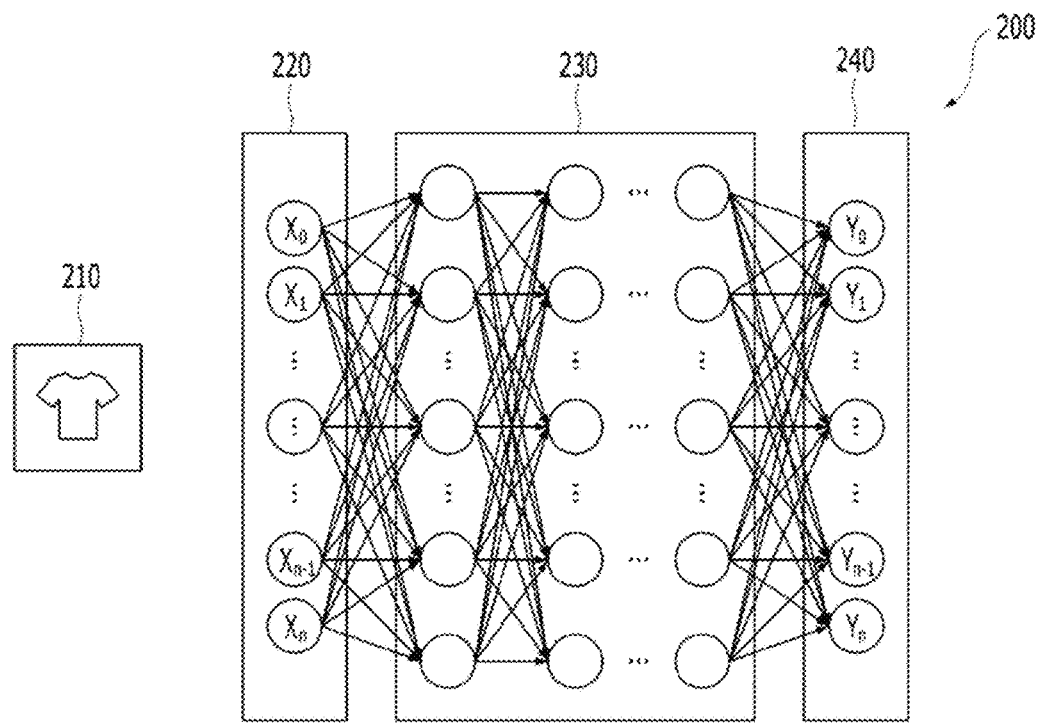
FIGS. 2 to 3 are diagrams for explaining specific implementation examples of the artificial neural network shown in FIG. 1 according to an embodiment of the present disclosure.
Figure 3:
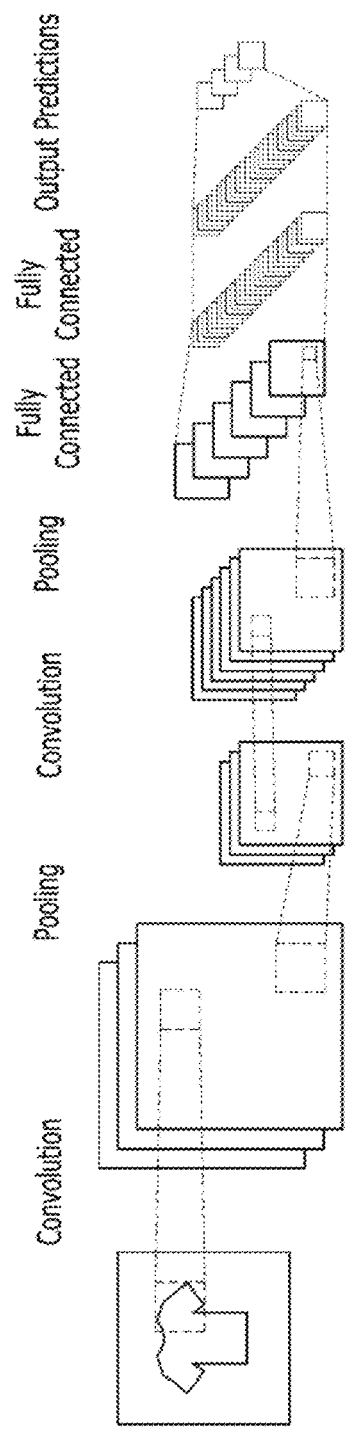

FIGS. 2 to 3 are views for explaining specific implementation examples of the artificial neural network 100 shown in FIG. 1 according to an embodiment of the present disclosure.

Referring to FIG. 2, the artificial neural network 200 may include an input node $(X_0, X_1 \ldots X_{n-1}, X_n)$ into which the input data 210 is input, an output node $(Y_0, Y_1 \ldots Y_{n-1}, Y_n)$ that outputs output data corresponding to the input data 210, and hidden nodes and multiple parameters located between input node and output node. The input node $(X_0, X_1 \ldots X_{n-1}, X_n)$ is a node configuring the input layer 220 and receives input data 210, for example, an image, from the outside, and the output node $(Y_0, Y_1 \ldots Y_{n-1}, Y_n)$ is a node configuring the output layer 240 and may output the output data to the outside. The hidden node located between the input node and the output node is a node configuring the hidden layer 230 and may connect output data of the input node to input data of the output node. Each node of the input layer 220 may be completely connected to each output node of the output layer 240 or may be incompletely connected, as shown in FIG. 2. In addition, the input node may serve to receive input data from the outside and transmit it to the hidden node. In this case, the hidden node and the output node may perform calculations on the data, and the calculation may be performed by multiplying the received input data by a parameter or weight. When the calculation of each node is completed, all calculation results are summed, and then output data may be output by using a preset activation function.

The hidden node and the output node $(Y_0, Y_1 \ldots Y_{n-1}, Y_n)$ have an activation function. The activation function may be one among a function, a sign function, a linear function, a logistic sigmoid function, a hyper tangent function, a ReLU function, and a softmax function. The activation function may be appropriately determined by a skilled person according to a learning method of an artificial neural network.

The artificial neural network 200 performs machine learning by repeatedly updating or modifying weight values to appropriate values. Representative methods of machine learning by the artificial neural network 200 include supervised learning and unsupervised learning.

Supervised learning is a learning method in which weight values are updated in a state that the target output data that the arbitrary neural network wants to compute for the input data is clearly defined, so that output data obtained by putting the input data into the neural network becomes close to the target data. The multi-layered artificial neural network 200 of FIG. 2 may be generated based on supervised learning.

Referring to FIG. 3, as another example of a multi-layered artificial neural network, there is a convolutional neural network (CNN) 300, which is a type of deep neural network (DNN). A convolutional neural network (CNN) is a neural network composed of one or several convolutional layers, a pooling layer, and a fully connected layer. The convolutional neural network (CNN) has a structure suitable for training two-dimensional data, and can be trained through a back-propagation algorithm. It is one of the representative models of DNN that is widely used in various application fields such as object classification and object detection in images.

Here, it should be noted that the multi-layered artificial neural network of the present disclosure is not limited to the artificial neural networks shown in FIGS. 2 and 3, and a trained model may be obtained by machine learning other types of data in various other artificial neural networks.

Figure 4:
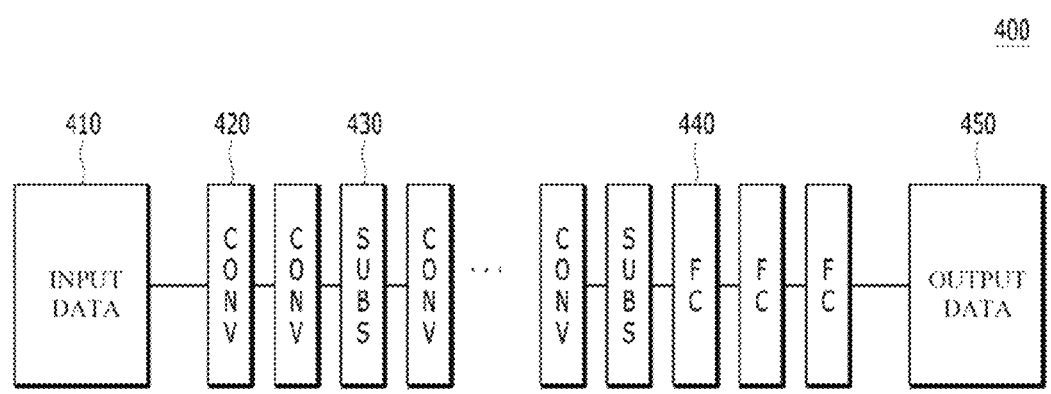
FIG. 4 is a diagram illustrating another example of an artificial neural network including a plurality of layers according to an embodiment of the present disclosure.

FIG. 4 is a diagram illustrating another example of an artificial neural network including a plurality of layers according to an embodiment of the present disclosure. The artificial neural network 400 as shown in FIG. 1 is a convolutional artificial neural network (CNN) including a plurality of convolutional layers (CONV) 420, a plurality of subsampling layers (SUBS) 430, and a plurality of fully connected layers (FC) 440.

The CONV 420 of the CNN 400 generates a feature map by applying a convolution weight kernel to the input data 410. Here, the CONV 420 may serve as a kind of template for extracting features from high-dimensional input data, for example, images or videos. Specifically, one convolution may be repeatedly applied several times while changing a location for a portion of the input data 410 to extract features for the entire input data 410. In addition, the SUBS 430 serves to reduce the spatial resolution of the feature map generated by the CONV 420. The subsampling functions to reduce the dimension of the input data, for example, a feature map, and through this, it is possible to reduce the complexity of an analysis problem of the input data 410. The SUBS 430 may use a max pooling operator that takes a maximum value or an average pooling operator that takes an average value for values of a part of the feature map. The SUBS 430 not only reduces the dimension of the feature map through a pooling operation, but also has the effect of making the feature map robust against shift and distortion. Finally, the FC 440 may perform a function of classifying input data based on the feature map.

The CNN 400 may execute various configurations and functions according to the number of layers of the CONV 420, SUBS 430, and FC 440 or the type of operator. For example, the CNN 400 may include any one of various CNN configurations such as AlexNet, VGGNet, LeNet, and ResNet, but is not limited thereto.

The CONV 420 of the CNN 400 having the configuration as described above may apply a weight to the input data 410 when image data is input as the input data 410 to generate a feature map through a convolution operation, and in this case, a group of weights to be used may be referred to as a weight kernel. The weight kernel is configured of a three-dimensional matrix of n×m×d (Here, n represents a row of a specific size like the input image data, m represents a column of a specific size, d represents a channel of the input image data, and the number of these dimensions is an integer greater than or equal to 1) and a feature map may be generated through a convolution operation by traversing the input data 410 at specified intervals. At this time, if the input data 410 is a color image having a plurality of channels, for example, three channels of RGB, the weight kernel may traverse each channel of the input data 410, calculate a convolution, and then generate a feature map for each channel.

Figure 5:
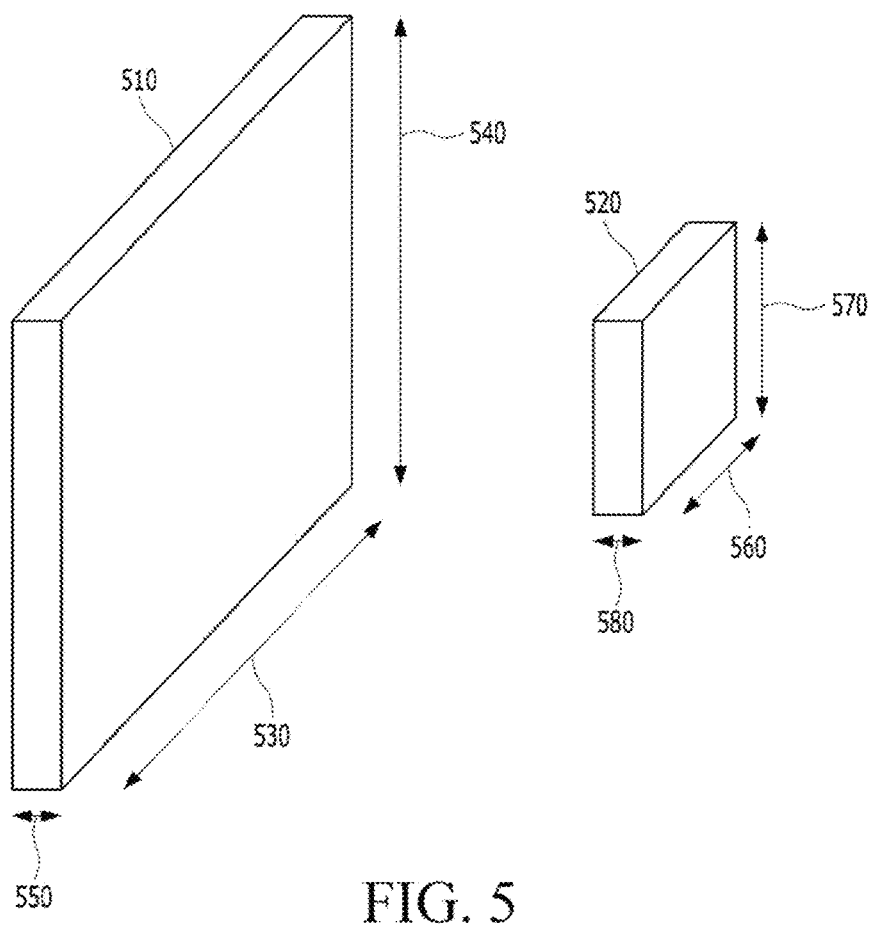
FIG. 5 is a diagram illustrating a weight kernel used for input data and a convolution operation in a convolution layer according to an embodiment of the present disclosure.

FIG. 5 is a diagram illustrating input data of a convolution layer and a weight kernel used for a convolution operation according to an embodiment of the present disclosure.

As illustrated, the input data 510 may be an image or a video displayed in a two-dimensional matrix configured of rows 530 of a specific size and columns 540 of a specific size. As described above, the input data 510 may have a plurality of channels 550, where the channel 550 may represent the number of color components of the input data image. Meanwhile, the weight kernel 520 may be a weight kernel used for convolution to extract features of the corresponding portion while scanning a predetermined portion of the input data 510. Like the input data image, the weight kernel 520 may be configured to have a specific sized row 560, a specific sized column 570, and a specific number of channels 580. In general, the sizes of the rows 560 and the columns 570 of the weight kernel 520 are set to be the same, and the number of channels 580 may be the same as the number of channels 550 of the input data image.

Figure 6:
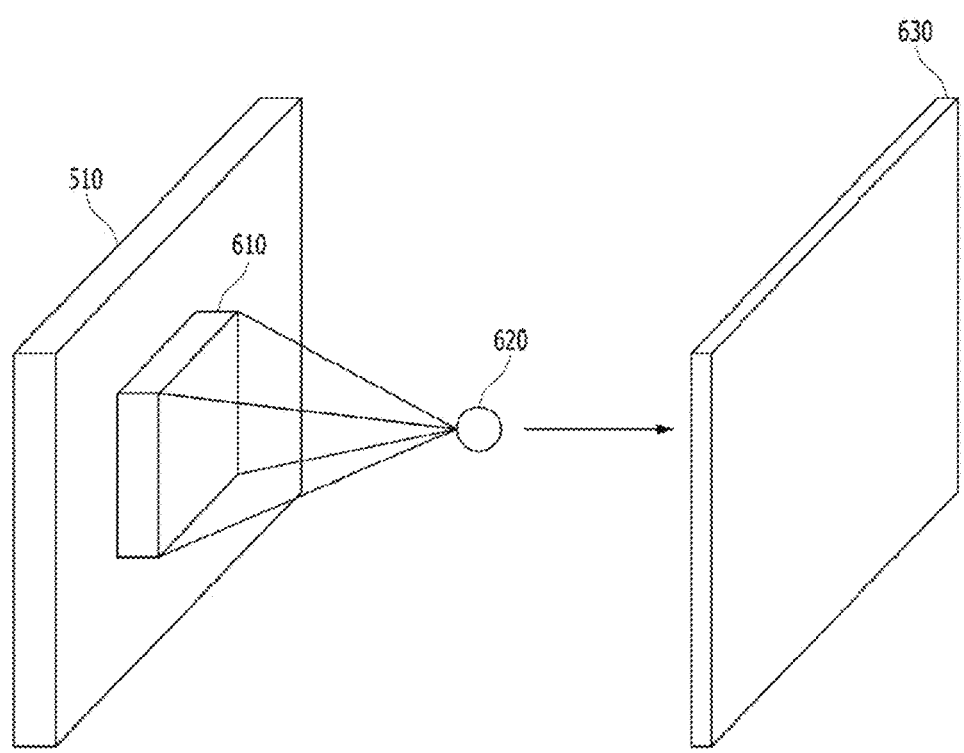
FIG. 6 is a diagram illustrating a procedure of generating a first activation map by performing convolution on input data using a first weighting kernel according to an embodiment of the present disclosure.

FIG. 6 is a diagram illustrating a procedure for generating a first activation map by performing convolution on input data using a first kernel according to an embodiment of the present disclosure.

The first weight kernel 610 may be a weight kernel indicating the first channel of the weight kernel 620 of FIG. 2. The first weight kernel 610 may finally generate the first activation map 630 by traversing the input data at specified intervals and performing convolution. When the first weight kernel 610 is applied to a part of the input data 510, convolution is performed by adding all the values generated by multiplying each of the input data values at a specific position of the part and the values at the corresponding position of the weight kernel. Through this convolution process, a first result value 620 is generated, and each time the first weight kernel 610 traverses the input data 510, result values of the convolution are generated to form a feature map. Each element value of the feature map is converted into the first activation map 630 through the activation function of the convolutional layer.

Figure 7:
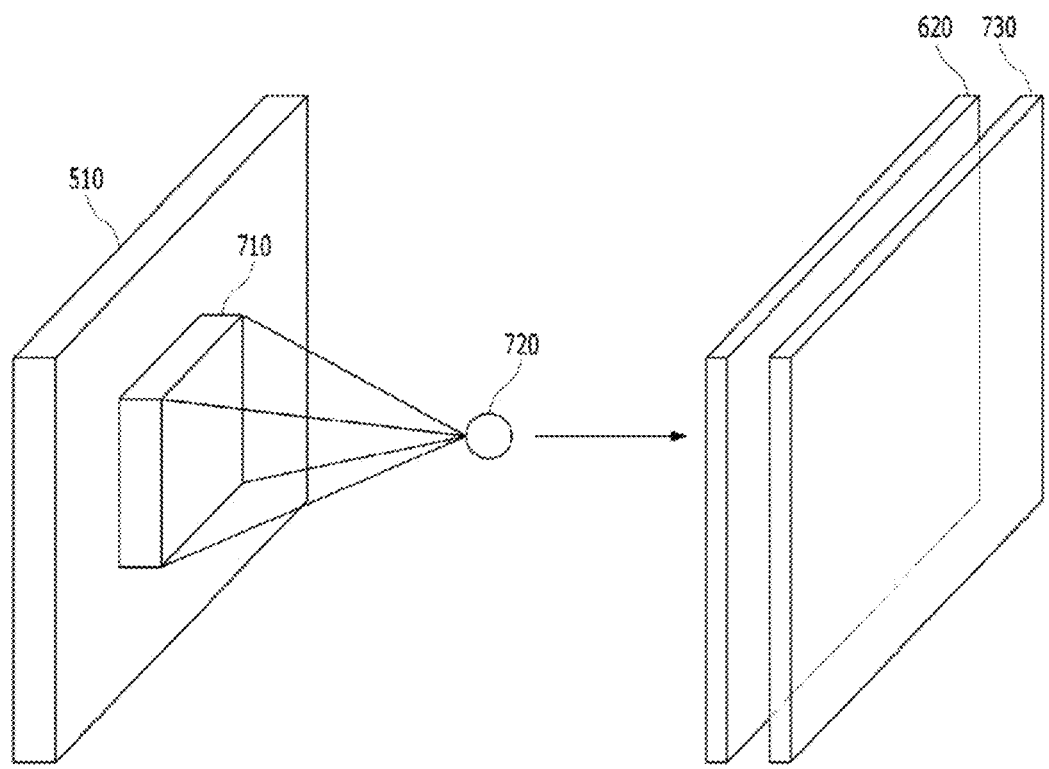
FIG. 7 is a diagram illustrating a procedure of generating a second activation map by performing convolution on input data using a second weighting kernel according to an embodiment of the present disclosure.

FIG. 7 is a diagram illustrating a procedure of generating a second activation map by performing convolution on input data using a second weight kernel according to an embodiment of the present disclosure.

As shown in FIG. 6, after performing convolution on the input data 510 using the first weight kernel 610 to generate the first activation map 620, as shown in FIG. 7, the second activation map 730 may be generated by performing convolution on the input data 510 using the second weight kernel 710.

The second weight kernel 710 may be a weight kernel indicating the second channel of the weight kernel 520 of FIG. 5. The second weight kernel 710 may finally generate the second activation map 730 by traversing the input data at specified intervals and performing convolution. As shown in FIG. 6, when the second weight kernel 710 is applied to a part of the input data 510, convolution is performed by adding all the values generated by multiplying each of the input data values at a specific position of the part and the values at the corresponding position of the weight kernel. Through this convolution process, a second result value 720 is generated, and each time the second weight kernel 710 traverses the input data 510, result values of the convolution are generated to form a feature map. Each element value of the feature map is converted into the second activation map 730 through the activation function of the convolutional layer.

Figure 8:
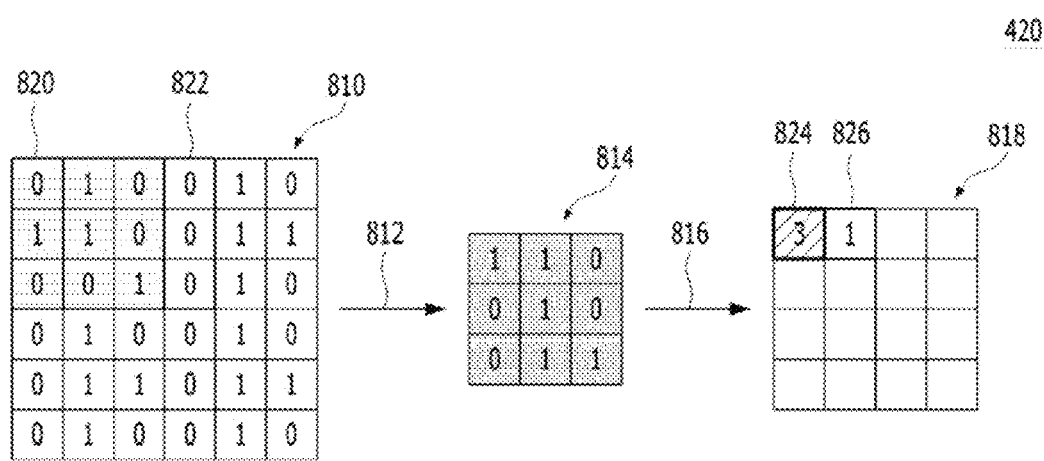
FIG. 8 is a diagram illustrating a process of calculating a convolutional layer as a matrix according to an embodiment of the present disclosure.

FIG. 8 is a diagram illustrating a computation process of a convolutional layer in a matrix when an input feature map has one channel according to an embodiment of the present disclosure.

The convolution layer 420 illustrated in FIG. 8 may correspond to the CONV 420 illustrated in FIG. 4. In FIG. 8, the input data 810 input to the convolution layer 420 is displayed as a two-dimensional matrix having a size of 6×6, and the weight kernel 814 is displayed as a two-dimensional matrix having a size of 3×3. However, the sizes of the input data 810 and the weight kernel 814 of the convolution layer 420 are not limited thereto, and may be variously changed according to the performance and requirements of the artificial neural network including the convolution layer 420.

As illustrated, when input data 810 is input to the convolution layer 420, the weight kernel 814 traverses the input data 810 at a predetermined interval, for example, 1, and thus, elementwise multiplication in which the input data 810 and values at the same position of the weight kernel 814 are multiplied can be performed. The weight kernel 814 traverses the input data 810 at regular intervals and sums 816 values obtained through elementwise multiplication.

Specifically, the weight kernel 814 assigns a value of elementwise multiplication, for example, "3", calculated at a specific location 820 of the input data 810 to the corresponding element 824 of the feature map 818. Next, the weight kernel 814 assigns a value of the elementwise multiplication, for example, "1", calculated at the next position 822 of the input data 810 to the corresponding element 826 of the feature map 818. In this way, when the weight kernel 814 traverses the input data 810 and allocates the values of the elementwise multiplication calculated to the feature map 818, the feature map 818 having a size of 4×4 is completed. At this time, if the input data 810 is composed of, for example, three channels (R channel, G channel, B channel), and then feature maps for each channel may be generated through convolution in which the same weight kernel or different channels for each channel traverse data for each channel of the input data 810 and perform elementwise multiplication 812 and summation 816.

Referring back to FIG. 4, the CONV 420 may generate an activation map, which is the final output result of the convolution layer, by applying an activation function to the feature map generated according to the method described with reference to FIGS. 2 to 8. Here, the activation function may be any one of various activation functions such as a sigmoid function, a radial basis function (RBF), a rectified linear unit (ReLU), or may be any one of various activation functions, a modified function thereof, or another function.

Meanwhile, the SUBS 430 receives the activation map, which is the output data of the CONV 420, as input data. The SUBS 430 performs a function of reducing the size of the activation map or highlighting specific data. When the SUBS 430 uses max pooling, the maximum value of the value in a specific area of the activation map is selected and output. In this way, noise of the input data can be removed through the pulling process of the SUBS 430 and the size of the data can be reduced.

In addition, the FC 440 may receive the output data of the SUBS 430 and generate the final output data 450. The activation map extracted from the SUBS 430 is one-dimensionally flattened to be input to the fully connected layer 440.

Figure 9:
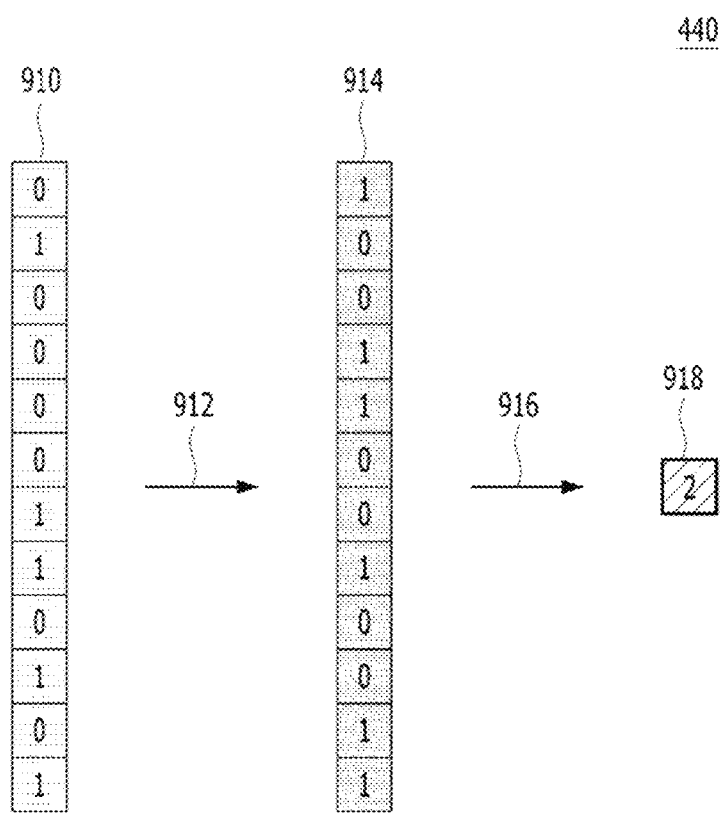
FIG. 9 is a diagram illustrating an operation process of a fully connected layer in a matrix according to an embodiment of the present disclosure.

FIG. 9 is a diagram illustrating an operation process of a fully connected layer as a matrix according to an embodiment of the present disclosure.

The fully connected layer 440 shown in FIG. 9 may correspond to the FC 440 of FIG. 4. As described above, the activation map extracted from the max pooling layer 430 may be flattened in one dimension to be input to the fully connected layer 440. The activation map flattened in one dimension may be received as input data 910 from the fully connected layer 440. In the fully connected layer 440, an elementwise multiplication 912 of the input data 910 and the weight kernel 914 may be performed using the one-dimensional weight kernel 914. The result of elementwise multiplication of the input data 910 and the weight kernel 914 may be summed 916 and output as output data 918. In this case, the output data 918 may represent an inference value for the input data 410 input to the CNN 400.

The CNN 400, having the above-described configuration, receives input data of a two-dimensional or one-dimensional matrix for each of a plurality of layers, and performs a training and inference process on the input data through complex operations such as elementwise multiplication and summation of weight kernels. Accordingly, depending on the number of layers configuring the CNN 400 or the complexity of operations, resources, for example, the number of operators or the amount of memory, required for data training and inference may increase considerably. Accordingly, in order to reduce the amount of computation and memory of an artificial neural network having a plurality of layers, such as the CNN 400, bit quantization for input and output data used for each layer may be performed. In one embodiment, bit quantization of the CNN 400 having a plurality of layers may be performed for the CONV 420 and the FC 440 that require a large amount of computation and memory.

Figure 10:
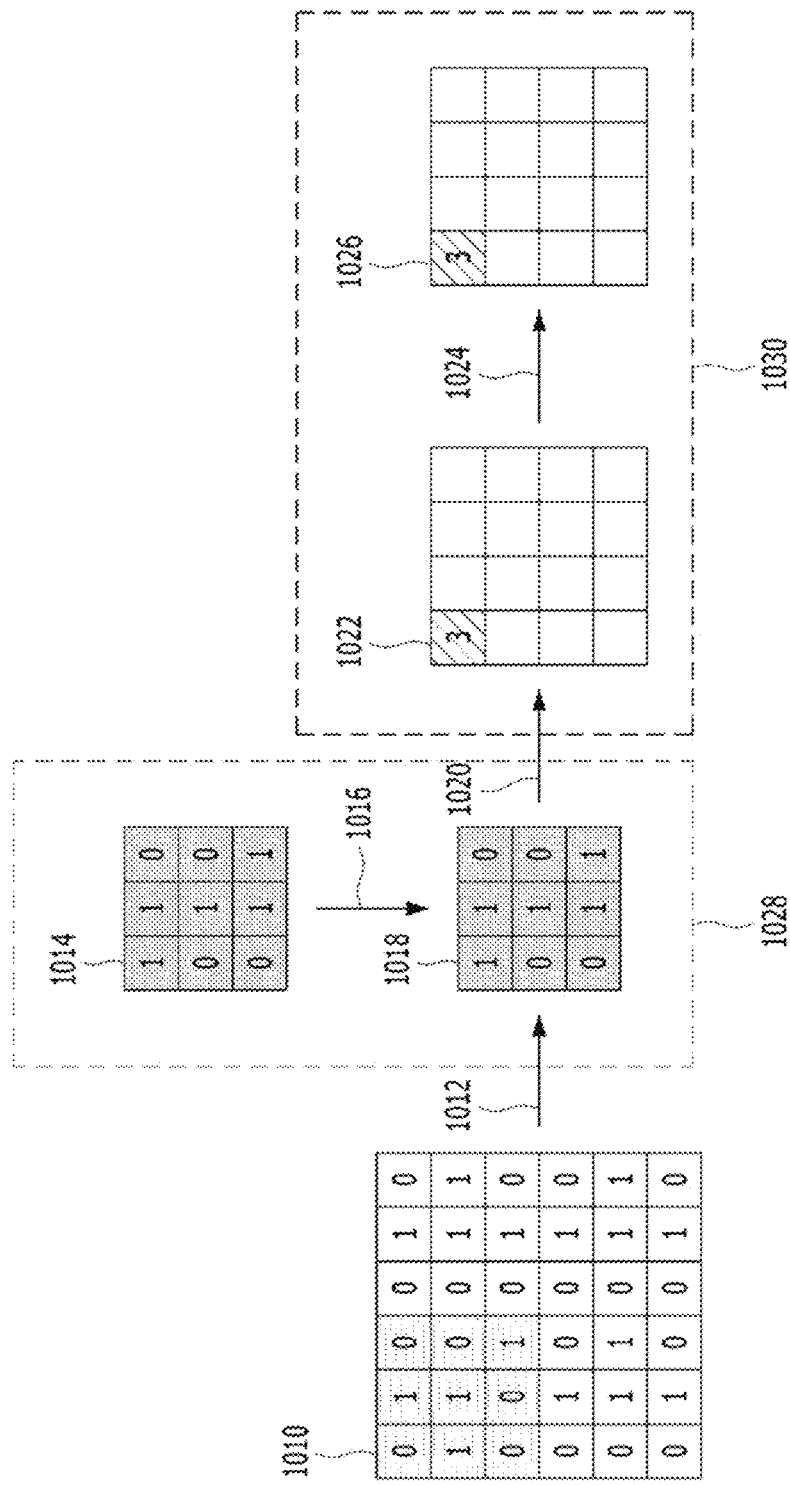
FIG. 10 is a diagram illustrating a bit quantization process of a convolution layer as a matrix according to an embodiment of the present disclosure.

FIG. 10 is a diagram illustrating a bit quantization process of a convolution layer as a matrix according to an embodiment of the present disclosure.

Bit quantization performed in the convolutional layer may include weight or weight kernel quantization (1028) for reducing the number of bits of each element value of the weight kernel used in the convolution operation, and/or feature map quantization or activation map quantization (1030) for reducing the number of bits of each element value of the feature map or activation map.

The bit quantization process of the convolutional layer according to an embodiment may be performed as follows. Before performing convolution by applying the weight kernel 1014 to the input data 1010 of the convolution layer, a quantization 716 process is performed on the weight kernel 1014 to generate the quantized weight kernel 1018. In addition, by applying the quantized weight kernel 1018 to the input data 1010 and executing elementwise multiplication (1012) and summation (1020) to output convolutional values to generate a feature map, then an activation map 1022 may be generated by an activation function. Next, a final quantization activation map 1026 may be generated through quantization 1024 for the activation map.

In the bit quantization process of the convolution layer described above, the weight kernel quantization 1028 may be performed using the following equation.

$$a_q = \text{quantization}(a_f) = \frac{1}{2^k} \times \text{round}(2^k \times a_f)$$

Where, $a_f$ is the weight value to be quantized, for example, the weight of a real number and each weight in the weight kernel, k represents the number of bits to quantize, $a_q$ represents the result of $a_j$ being quantized by k bits. That is, according to the above formula, firstly, $a_j$ is multiplied by a predetermined binary number $2^k$, so that $a_j$ is incremented by k bits, hereinafter referred to as "the first value". Next, by performing a rounding or truncation operation on the first value, the number after the decimal point of, $a_j$ is removed, hereinafter referred to as "second value". The second value is divided by a binary number of $2^k$, and the number of bits is reduced again by k bits, so that the element value of the final quantized weight kernel can be calculated. Such weight or weight kernel quantization 1028 is repeatedly executed for all element values of the weight or weight kernel 1014 to generate quantized weight values 1018.

Meanwhile, the feature map or activation map quantization 1030 may be performed by the following equation.

$$a_f = a_f \cdot \text{clip}(-1, 1)$$
$$a_q = \text{quantization}(a_f) = \frac{1}{2^k} \times \text{round}(2^k \times a_f)$$

In the feature map or activation map quantization 1030, the same formula as the weight or weight kernel quantization 1028 method may be used. However, in feature map or activation map quantization, a process of normalizing each element value of the feature map or the activation map 1022 to a value between 0 and 1 can be added by applying clipping before quantization is applied for each element value $a_j$, for example, a real number, of the feature map or activation map.

Next, the normalized $a_j$ is multiplied by a predetermined binary number $2^k$, so that $a_j$ is incremented by k bits, hereinafter referred to as "the first value". Next, by performing a rounding or truncation operation on the first value, the number after the decimal point of, $a_j$ is removed, hereinafter referred to as "second value". The second value is divided by a binary number of $2^k$, and the number of bits is reduced again by k bits, so that the element values of the final quantized feature map or activation map 1026 may be calculated. The quantization 1030 of such a feature map or activation map is repeatedly executed for all the element values of the feature map or activation map 1022 to generate a quantized feature map or activation map 1026.

Through the described weight or weight kernel quantization 1028 and the feature map or activation map quantization 1030, the memory size and the amount of computation required for a convolution operation of the convolutional layer 420 of the convolutional neural network can be reduced in a unit of bits.

Figure 11:
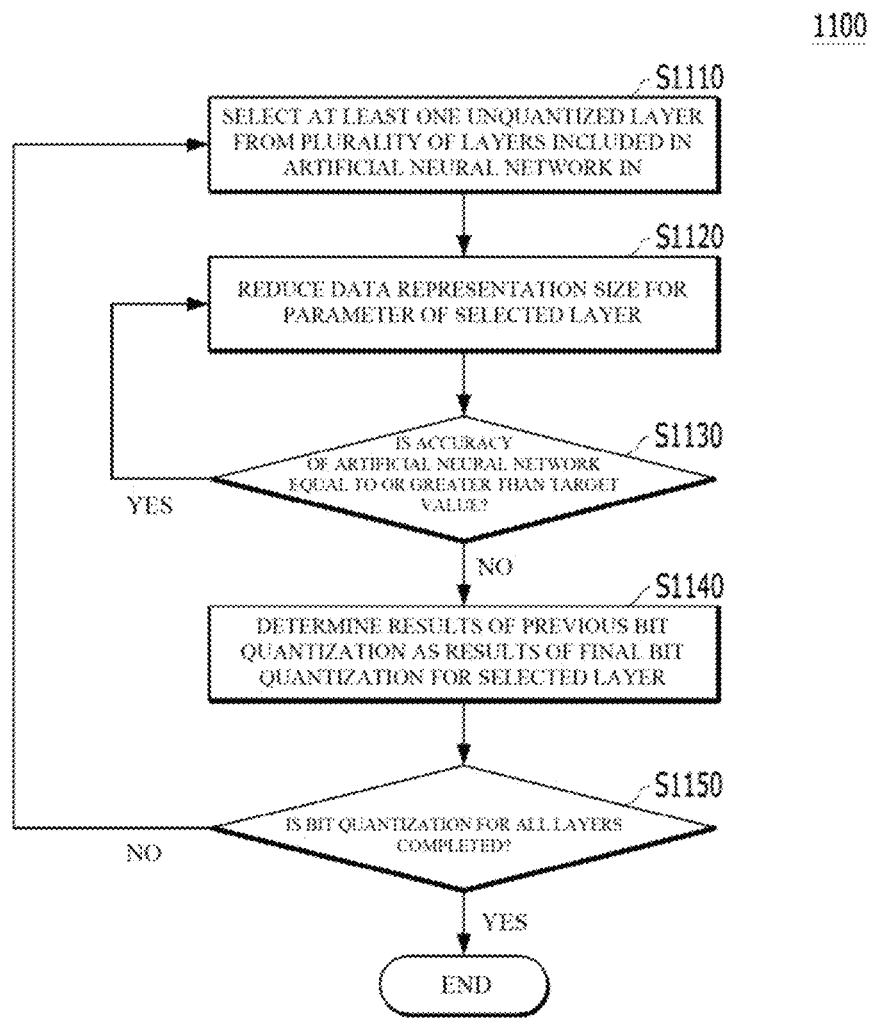
FIG. 11 is a flowchart illustrating a method of quantizing bits of an artificial neural network according to an embodiment of the present disclosure.

FIG. 11 is a flowchart illustrating a method of quantizing bits of an artificial neural network according to an embodiment of the present disclosure. This embodiment is an example in which a unit of a data group that can be quantized in an artificial neural network is assumed to be all parameters belonging to each layer configuring an artificial neural network.

As shown, the bit quantization method 1100 of the artificial neural network may be initiated by selecting at least one layer from a plurality of layers included in the artificial neural network S1110. A layer to be selected from a plurality of layers included in the artificial neural network may be determined according to the influence of the layer to be selected on the overall performance or amount of computation or amount of memory of the artificial neural network. In an embodiment, in the multi-layered artificial neural network described with reference to FIGS. 1 to 3 described above, a layer having a large influence on the overall performance or computational amount of the artificial neural network may be arbitrarily selected. In addition, in the case of the convolutional artificial neural network (CNN) 400 described with reference to FIGS. 4 to 10, since the convolutional layer 420 and/or the fully connected layer 440 has a large effect on the overall performance or computational amount of the CNN 400, at least one of these layers 420 and 440 may be selected.

A method of selecting at least one of the plurality of layers included in the artificial neural network may be determined according to an influence of the selected layer on the overall performance or computational amount of the artificial neural network. However, the present disclosure is not limited thereto, and one of various methods may be included. For example, the selection of at least one layer from a plurality of layers included in the artificial neural network may be performed according to (i) a method of sequentially selecting a layer from the first layer to which the input data is received to subsequent layers according to the arrangement order of the plurality of layers configuring the artificial neural network, (ii) a method of sequentially selecting the last layer from which the final output data is generated to the previous layer according to the arrangement order of the plurality of layers configuring the artificial neural network, (iii) a method of selecting the layer with the highest computational amount among the plurality of layers configuring the artificial neural network, or (iv) a method of selecting the least computational layer from the plurality of layers configuring the artificial neural network.

When the layer selection of the artificial neural network is completed in S1110, the operation may proceed to step S1120 of reducing the data representation size for a parameter, for example, weight of the selected layer to a unit of bits.

In one embodiment, when the weight or the size of the output data among the parameters of the selected layer is reduced to a unit of bits, the weight kernel quantization 1028 and the activation map quantization 1024 described with reference to FIGS. 4 to 10 may be performed. For example, the weight kernel quantization 1028 may be calculated by the following equation.

$$a_q = \text{quantization}(a_f) = \frac{1}{2^k} \times \text{round}(2^k \times a_f)$$

Here, $a_j$ denotes an element value of a weight kernel to be quantized, for example, a real weight kernel coefficient, k denotes the number of bits to be quantized, and $a_q$ denotes a result in which $a_j$ is quantized by k bits. That is, according to the above equation, first, $a_j$ is multiplied by a predetermined binary number $2^k$, so that $a_j$ is increased by k bits, i.e., "the first value". Next, by performing a rounding or truncation operation on the first value, the number after the decimal point of $a_j$ is removed, i.e., "the second value". The second value is divided by $2^k$ binary numbers, and the number of bits is reduced again by k bits, so that the element value of the final quantized weight kernel can be calculated. Such weight kernel quantization 1028 is repeatedly executed for all the element values of the weight kernel 1014 to generate a quantization weight kernel 1018.

Meanwhile, the activation map quantization 1030 may be performed by the following equation.

$$a_f = a_f \cdot \text{clip}(-1, 1)$$

$$a_q = \text{quantization}(a_f) = \frac{1}{2^k} \times \text{round}(2^k \times a_f)$$

In the activation map quantization 1030, clipping is applied before quantization for each element value $a_j$, for example, a coefficient of real number, of the activation map 1022 is applied, so a process of normalizing each element value of the activation map 1022 to a value between 0 and 1 may be added. Next, the normalized $a_j$ is multiplied by a predetermined binary number $2^k$, so that $a_j$ is increased by k bits, i.e., "the first value". Next, by performing a rounding or truncation operation on the first value, the number after the decimal point of $a_j$ is removed, i.e., "the second value". The second value is divided by $2^k$ binary numbers, and the number of bits is reduced again by k bits, so that the element value of the final quantized activation map 1026 may be calculated. Such quantization 1030 of the activation map is repeatedly executed for all the element values of the activation map 1022, and the quantization activation map 1026 is generated.

In the above-described embodiments, an example of reducing the number of bits of the weight value or the activation map data has been described in order to reduce the size of the data representation for the parameter of the layer selected in the artificial neural network. However, the bit quantization method of the present disclosure is not limited thereto. In another embodiment, different bits can be allocated for the data in the intermediate stages that exist between multiple computational steps for various data included in the selected layer in the artificial neural network. Accordingly, in order to reduce the size of a memory, for example, buffer, register, or cache, in which each data is stored when implemented in hardware of an artificial neural network, the number of bits of each data stored in the corresponding memory may be reduced and the number of bits of the corresponding memory may be decreased. In the other embodiment, the size of a data bit of a data path through which data of a layer selected in the artificial neural network is transmitted may be reduced in bit units.

After the execution of step S1120, a step S1130 of determining whether the accuracy of the artificial neural network is equal to or greater than a predetermined target value may proceed. If the accuracy of the output result of the artificial neural network, for example, the training result or the inference result of the artificial neural network, is more than the predetermined target value after reducing the data representation size of the parameter of the selected layer in the artificial neural network to a unit of bits, it can be expected that the overall performance of the artificial neural network can be maintained even by additionally reducing the bits of the data.

Accordingly, when it is determined in step S1130 that the accuracy of the artificial neural network is greater than or equal to the target value, the process proceeds to step S1120 to further reduce the data representation size of the selected layer to a unit of bits.

In step S1130, if the accuracy of the artificial neural network is not higher than the target value, it may be determined that the accuracy of the artificial neural network is degraded due to the currently executed bit quantization. Accordingly, in this case, the minimum number of bits that satisfies the accuracy target value in the bit quantization performed immediately before may be determined as the final number of bits for the parameter of the selected layer, i.e., step S1140.

Next, it is determined whether bit quantization for all layers of the artificial neural network is completed, i.e., step S1150. In this step, if it is determined that bit quantization for all layers of the artificial neural network is completed, the entire process is terminated. On the other hand, if a layer that has not been bit quantized yet remains among the layers of the artificial neural network, step S1110 is executed to perform bit quantization for the corresponding layer.

Here, in the step S1110, the method of selecting the other layer from the plurality of layers included in the artificial neural network may be performed according to (i) a method of sequentially selecting the next layer of the previously selected layer according to the arrangement order of the plurality of layers configuring the artificial neural network, i.e., "forward bit quantization", (ii) a method of selecting the previous layer of the previously selected layer in the backward direction according to the arrangement order of the plurality of layers configuring the artificial neural network, i.e., "backward bit quantization", (iii) a method of selecting a layer with a higher computational amount after the previously selected layer according to the order of computational amount among a plurality of layers configuring an artificial neural network, i.e., "high computational cost bit quantization", or (iv) a method of selecting a layer with a lower computational amount after the previously selected layer according to the order of computational amount among a plurality of layers configuring an artificial neural network, i.e., "low computational cost bit quantization".

In one embodiment, the accuracy of the artificial neural network may mean the probability that the artificial neural network will provide a solution to the problem in the inference stage after learning a solution to a given problem, for example, recognition of an object included in an image as input data. In addition, the target value used in the bit quantization method described above may represent a minimum accuracy to be maintained after bit quantization of the artificial neural network. For example, assuming that the target value is 90% accuracy, even after the parameter of the layer selected by bit quantization is reduced in bit units, additional bit quantization may be performed if the accuracy of the artificial neural network is 90% or more. For example, after performing the first bit quantization, if the accuracy of the artificial neural network is measured to be 94%, additional bit quantization can be performed. After executing the second bit quantization and if the accuracy of the artificial neural network is measured to be 88% then the number of bits determined by the first bit quantization, the results of the currently performed bit quantization is discarded, and the number of bits determined by the first bit quantization, i.e., the number of bits for representing the corresponding data, may be determined as the final bit quantization result.

In one embodiment, in an artificial neural network including a plurality of layers according to the computational cost bit quantization method, when selecting a layer to perform bit quantization based on the amount of computation among a plurality of layers, the computational amount of each layer can be determined as follows. That is, when one addition operation performs an addition of n bits and m bits in a specific layer of the artificial neural network, the amount of operation is calculated as (n+m)/2. In addition, when a specific layer of the artificial neural network multiplies n bits and m bits, the amount of calculation for the corresponding operation may be calculated as n×m. Accordingly, the amount of calculation of a specific layer of the artificial neural network may be a result of summing all the calculation amounts of addition and multiplication performed by that layer.

In addition, according to the computational cost bit quantization method, the method of performing bit quantization by selecting a layer from a plurality of layers based on the computational amount in an artificial neural network is not limited to that shown in FIG. 11 and various modifications are possible.

In another embodiment, bit quantization of a parameter for each layer in the embodiment shown in FIG. 11 may be performed separately for a weight and an activation map. For example, first, quantization is performed on the weight of the selected layer, and as a result of this, the weight has n bits. Separately, by performing bit quantization on the output activation data of the selected layer, the number of representation bits of the activation map data can be determined as m bits. Alternatively, quantization may be performed while allocating the same bit for the weight of the corresponding layer and the activation map data, and as a result, the same n bits may be used for both the weight and the activation map data.

Figure 12:
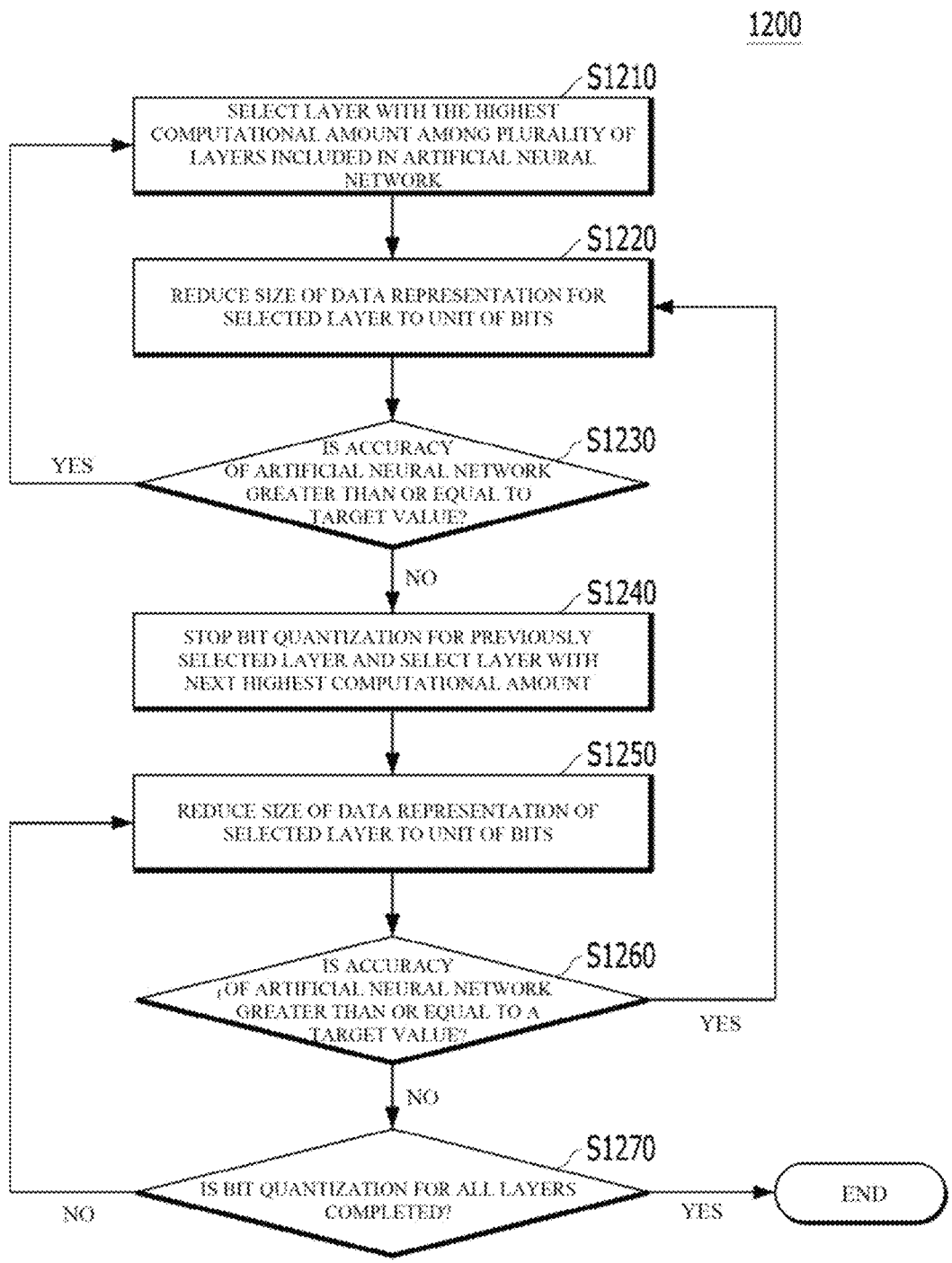
FIG. 12 is a flowchart illustrating a method of quantizing bits of an artificial neural network according to another embodiment of the present disclosure.

FIG. 12 is a flowchart illustrating a bit quantization method of an artificial neural network according to another embodiment of the present disclosure.

As illustrated, the bit quantization method 1200 of an artificial neural network may be started with selecting a layer with the highest computational amount among a plurality of layers included in the artificial neural network S1210.

When the layer selection of the artificial neural network is completed in step S1210, the operation may proceed to step of reducing the size of the data representation for the parameter of the selected layer to a unit of bits S1220. In an embodiment, when the size of the data of the selected layer is reduced to a unit of bits, the weight kernel quantization 1028 and the activation map quantization 1024 described with reference to FIGS. 4 to 10 may be performed.

After the execution of step S1220, the step of determining whether the accuracy of the artificial neural network reflecting the bit quantization result so far is greater than or equal to a predetermined target value S1230 may proceed. If it is determined in step S1230 that the accuracy of the artificial neural network is greater than or equal to the target value, the size of the data of the corresponding layer is set as the current bit quantization result, and after proceeding to step S1210, steps S1210 to S1230 may be repeatedly executed. That is, by proceeding to step S1210, the computational amount is calculated again for all layers in the artificial neural network, and based on this, the layer with the highest computational amount is selected again.

In step S1230, if the accuracy of the artificial neural network is not higher than the target value, the bit reduction quantization for the currently selected layer is canceled, and that layer is excluded from the target of a layer that can be selected in the layer selection step S1210. Then, a layer with a higher computational amount after the corresponding layer may be selected, step S1240. Next, the size of the data of the selected layer may be reduced to a unit of bits, step S1250.

In step S1260, it is determined whether the accuracy of the artificial neural network reflecting the bit quantization result so far is greater than or equal to a target value. If the accuracy of the artificial neural network is not higher than the target value, it is determined whether bit quantization for all layers of the artificial neural network is completed, S1270. If it is determined in step S1270 that bit quantization for all layers of the artificial neural network is completed, the entire bit quantization process is terminated. On the other hand, if it is determined in step S1270 that bit quantization for all layers of the artificial neural network has not been completed, the process may proceed to step S1240.

If it is determined in step S1260 that the accuracy of the artificial neural network is greater than or equal to the target value, the process proceeds to step 1220 to proceed with a subsequent procedure.

Figure 13:
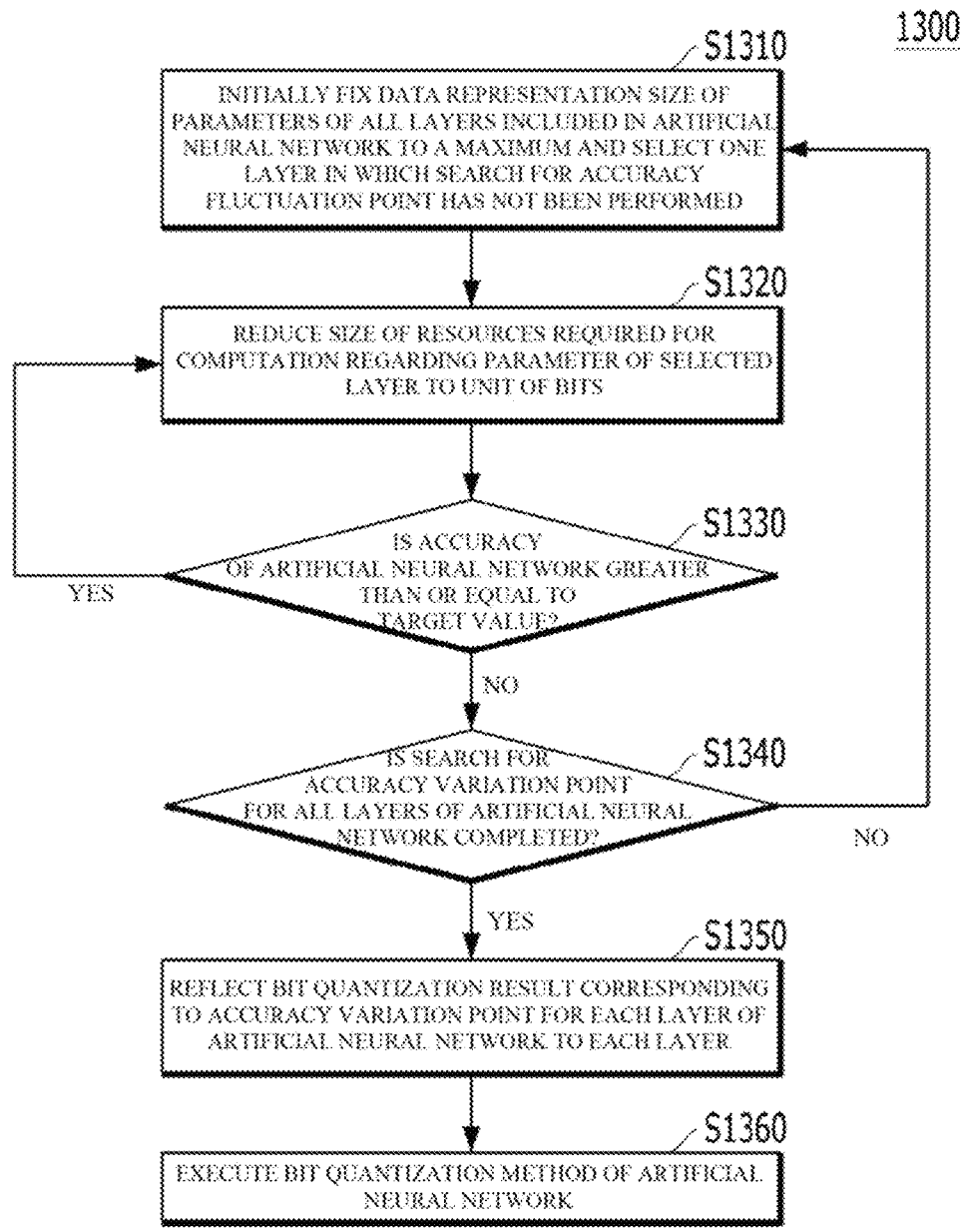
FIG. 13 is a flowchart illustrating a bit quantization method of an artificial neural network according to the other embodiment of the present disclosure.

FIG. 13 is a flowchart illustrating a bit quantization method of an artificial neural network having a plurality of layers according to the other embodiment of the present disclosure.

As shown, the bit quantization method 1300 of an artificial neural network having a plurality of layers includes steps S1310 to S1350 of searching for an accuracy fluctuation point for each of all layers included in the artificial neural network. The method 1300 starts with initially fixing the bit size of data of all layers included in the artificial neural network to a maximum and selecting one layer in which the search for an accuracy fluctuation point has not been performed S1310.

When the layer selection of the artificial neural network is completed in step S1310, it may be proceeded to step of reducing the size of the data of the selected layer to a unit of bits S1320. In an embodiment, when the size of the data of the selected layer is reduced to a unit of bits, the weight kernel quantization 1028 and the activation map quantization 1024 described with reference to FIGS. 4 to 10 may be performed.

After the execution of step S1320, the step of determining whether the accuracy of the artificial neural network reflecting the bit quantization result up to now for the selected layer is greater than or equal to a predetermined target value S1330 may be performed. If it is determined in step S1330 that the accuracy of the artificial neural network is greater than or equal to the target value, the process proceeds to step S1320 to perform additional bit reduction quantization for the currently selected layer.

In step S1330, if the accuracy of the artificial neural network is not higher than the target value, the number of data bits of the currently selected layer is set to the minimum number of bits that have most recently satisfied the target value. Thereafter, it is determined whether the search for the accuracy variation point for all layers of the artificial neural network has been completed S1340. In this step, if the search for the accuracy variation point for all the layers is not completed, the process may proceed to step S1310. In step S1310, another layer is selected in which the bit size of the data of all the layers included in the artificial neural network is the maximum and the search for the performance change point has not been performed.

If it is determined in step S1340 that the search for the accuracy variation points for all layers of the artificial neural network has been completed, the bit quantization result corresponding to the accuracy variation point for each layer of the artificial neural network may be reflected in the artificial neural network S1350. In an embodiment, in step S1350, the corresponding layer is set to the bit size of the data immediately before the accuracy variation point of each layer of the artificial neural network determined according to the steps S1310 to S1350 described above, for example, the point where the accuracy of the artificial neural network is degraded in each layer.

In another embodiment, in step S1350, the corresponding layer is set to be larger than the size of the resource required for the calculation of the parameter immediately before the point of variation of the accuracy of each layer of the artificial neural network determined according to the steps S1310 to S1340 described above. For example, the number of bits of the parameter of each layer of the artificial neural network may be set to be 2 bits larger than the number of bits immediately before the accuracy variation point. Then, the bit quantization method S1360 is performed on the artificial neural network having the data size of each layer set in step 1350. The bit quantization method executed in step S1360 may include, for example, the method shown in FIG. 11 or FIG. 12.

The bit quantization method of the artificial neural network according to the various embodiments described above is not limited to being executed on the weight kernel and the feature map or activation map of each of a plurality of layers of the artificial neural network. In one embodiment, the bit quantization method of the present disclosure, the weight kernels or weights of all layers of the artificial neural network are first executed, and bit quantization may be performed again on the feature maps of all the layers of the artificial neural network in which the weight kernel quantization is reflected. In another embodiment, bit quantization may be performed first on feature maps of all layers of the artificial neural network, and bit quantization may be performed again on kernels of all layers of the artificial neural network in which the feature map quantization is reflected.

In addition, the bit quantization method of the artificial neural network of the present disclosure is not limited to applying the same level of bit quantization to the weight kernels of each layer of the artificial neural network. In one embodiment, the bit quantization method of the present disclosure, bit quantization may be performed in units of weight kernels of each layer of the artificial neural network, or individual bit quantization may be performed so as to have different bits in each weight unit that is an element of each weight kernel.

Hereinafter, examples of execution results of a method for quantizing bits of an artificial neural network according to various embodiments of the present disclosure will be described with reference to the drawings.

Figure 14:
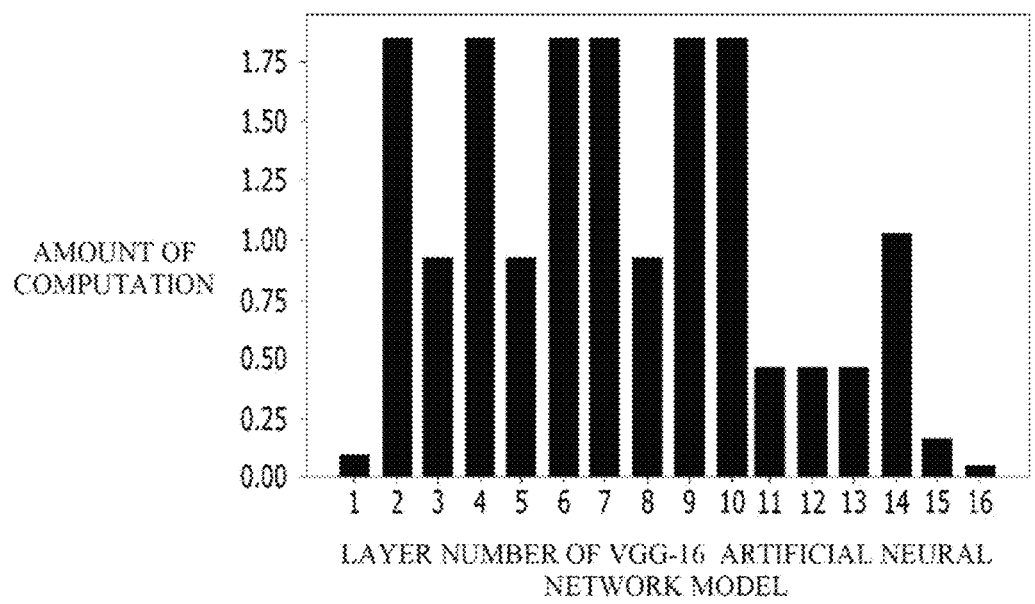
FIG. 14 is a graph showing an example of an amount of computation for each layer of an artificial neural network according to an embodiment of the present disclosure.

FIG. 14 is a graph showing an example of an amount of computation for each layer of an artificial neural network according to an embodiment of the present disclosure. The artificial neural network shown in FIG. 14 is an example of a convolutional artificial neural network of the VGG-16 model including 16 layers, and each layer of the artificial neural network has a different amount of computation.

For example, since the second layer, the fourth layer, the sixth layer, the seventh layer, the ninth layer, and the tenth layer have the highest amount of computation, bit quantization may be applied first when the high computational cost bit quantization method is followed. In addition, after bit quantization for the second, fourth, sixth, seventh, ninth, and tenth layers is performed, bit quantization may be performed for a 14th layer with a next high computational amount.

Figure 15:
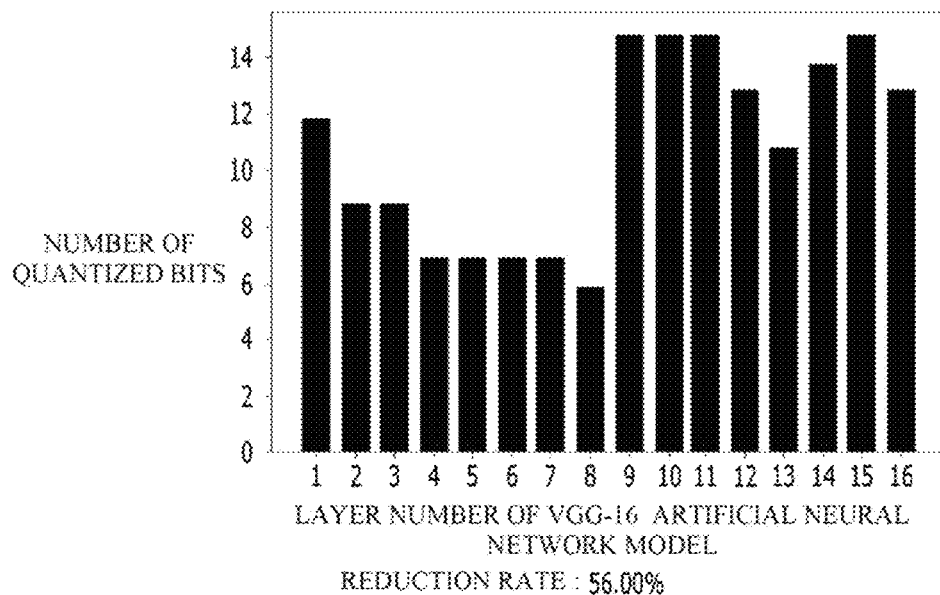
FIG. 15 is a graph showing the number of bits per layer of an artificial neural network in which bit quantization is performed by a forward bit quantization method according to an embodiment of the present disclosure.

FIG. 15 is a graph showing the number of bits per layer of an artificial neural network in which bit quantization has been performed by a forward bit quantization method according to an embodiment of the present disclosure.

As described above, forward quantization is a method of sequentially performing bit quantization from the earliest layer, for example, from the layer where input data is first received, based on the arrangement order of a plurality of layers included in the artificial neural network. FIG. 15 shows the number of bits for each layer after applying forward quantization to the artificial neural network of the VGG-16 model shown in FIG. 14 and a reduction rate of the computational amount of the artificial neural network by forward quantization. For example, when the addition of n bits and m bits is performed, the amount of computation for the corresponding computation is calculated as (n+m)/2. In addition, when multiplication of n bits and m bits is performed, the amount of computation for the corresponding computation may be calculated as n×m. Accordingly, the total amount of computation of the artificial neural network may be a result of summing all the computation amounts of addition and multiplication performed by the artificial neural network.

As shown, when bit quantization was performed on the artificial neural network of the VGG-16 model using forward quantization, the number of bits of the layers arranged front side of the artificial neural network has been relatively reduced more and the number of bits of the layers arranged rear side of the artificial neural network has been relatively reduced less. For example, while the number of bits of the first layer of the artificial neural network has been reduced to 12 bits and the number of bits of the second layer and the third layer is reduced to 9 bits each, but the number of bits of the 16th layer decreased to 13 bits and the number of bits of the 15th layer decreased only up to 15 bits. As described above, when forward quantization was sequentially applied from the first layer to the 16th layer of the artificial neural network, the reduction rate of the total computational amount of the artificial neural network was calculated as 56%.

Figure 16:
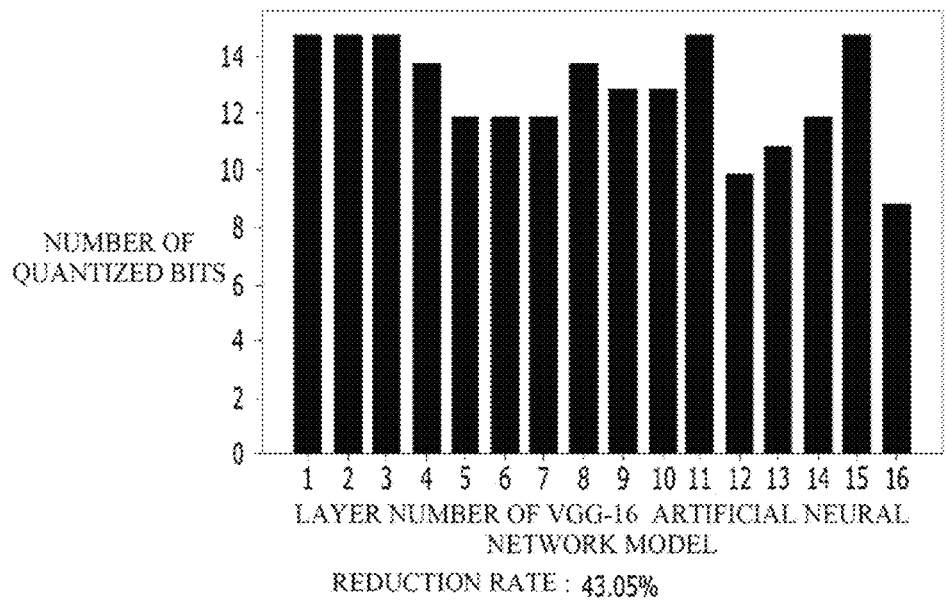
FIG. 16 is a graph showing the number of bits per layer of an artificial neural network in which bit quantization is performed by a backward bit quantization method according to an embodiment of the present disclosure.

FIG. 16 is a graph showing the number of bits per layer of an artificial neural network in which bit quantization has been performed by a backward bit quantization method according to an embodiment of the present disclosure.

Backward quantization is a method of sequentially performing bit quantization from the last layer, for example, from the layer where output data is finally output, based on the arrangement order of a plurality of layers included in the artificial neural network. FIG. 16 shows the number of bits for each layer after applying backward quantization to the artificial neural network of the VGG-16 model shown in FIG. 14 and a reduction rate of the computational amount of the artificial neural network by backward quantization.

As shown, when bit quantization was performed on the artificial neural network of the VGG-16 model using backward quantization, the number of bits of the layers arranged rear side of the artificial neural network has been relatively reduced more and the number of bits of the layers arranged front side of the artificial neural network has been relatively reduced less. For example, the number of bits of the first layer, the second layer, and the third layer is reduced to 15 bits, respectively, and the number of bits of the fourth layer is reduced to 14 bits, while the number of bits of the 16th layer is reduced to 9 bits, and the number of bits of the 15th layer is reduced to 15 bits. As described above, when backward quantization was sequentially applied from the first layer to the 16th layer of the artificial neural network, the reduction rate of the total computational amount of the artificial neural network was calculated as 43.05%.

Figure 17:
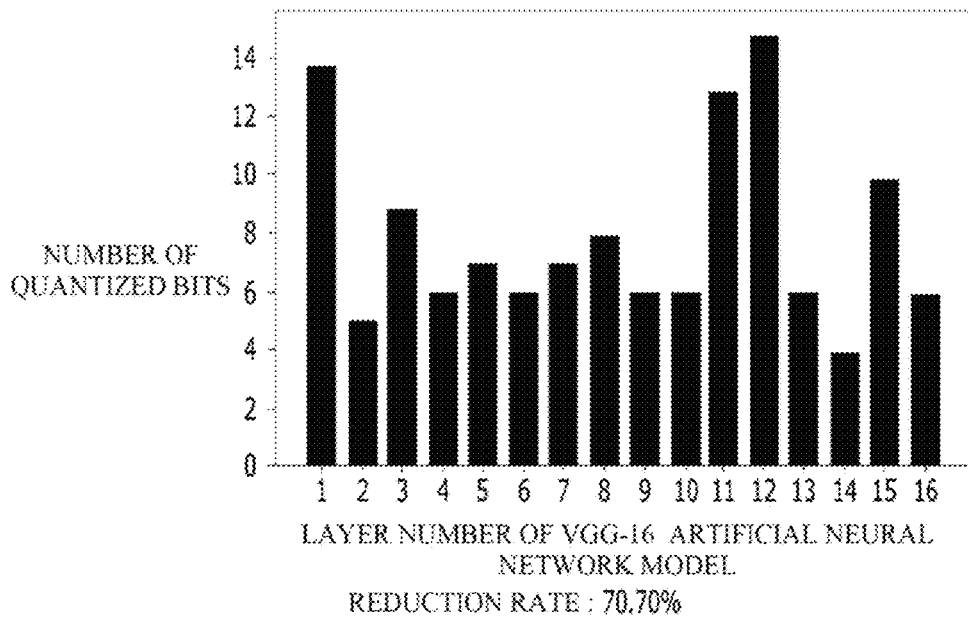
FIG. 17 is a graph showing the number of bits per layer of an artificial neural network in which bit quantization is performed by a high computational cost layer first bit quantization method according to an embodiment of the present disclosure.

FIG. 17 is a graph showing the number of bits for each layer of an artificial neural network in which bit quantization is performed by a high computational cost layer first bit quantization method according to an embodiment of the present disclosure.

High computation layer first quantization or high computation quantization is a method of sequentially performing bit quantization from a layer with a higher computational amount among a plurality of layers included in an artificial neural network. FIG. 17 shows the number of bits for each layer and a reduction rate of the computational amount of the artificial neural network by the high computation quantization after applying high computation quantization to the artificial neural network of the VGG-16 model shown in FIG. 14.

As shown, when bit quantization is performed on the artificial neural network of the VGG-16 model using high computation quantization, the number of bits of the layers with high computational amount among the plurality of layers of the artificial neural network is relatively reduced more. For example, the number of bits of the second layer and the tenth layer is reduced to 5 and 6 bits, respectively, while the number of bits of the first layer is reduced to 14 bits. In this way, when high computation quantization was applied to the layers of the artificial neural network in order of computation amount, the reduction rate of the computation amount of the entire artificial neural network was calculated as 70.70%.

Figure 18:
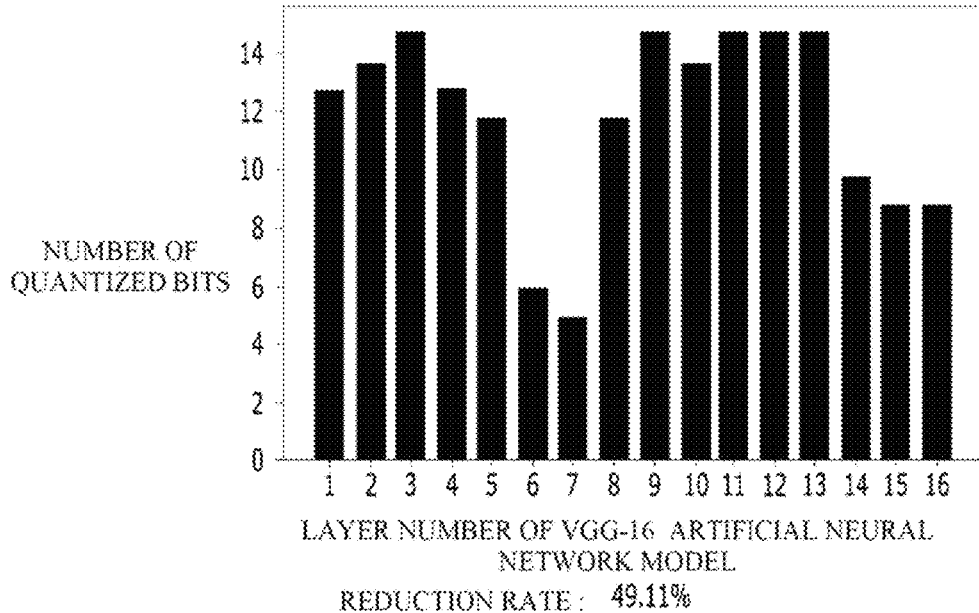
FIG. 18 is a graph showing the number of bits per layer of an artificial neural network in which bit quantization is performed by a low computational cost layer first bit quantization method according to an embodiment of the present disclosure.

FIG. 18 is a graph showing the number of bits per layer of an artificial neural network in which bit quantization is performed by a low computational cost bit quantization method according to an embodiment of the present disclosure.

Low computation layer first quantization or low computation quantization is a method of sequentially performing bit quantization from a layer with a lower computational amount among a plurality of layers included in an artificial neural network. FIG. 18 shows the number of bits for each layer after applying the low computation amount quantization and the reduction rate of the computation amount of the artificial neural network by the low computation amount quantization for the artificial neural network of the VGG-16 model shown in FIG. 14.

As shown, even when bit quantization is performed on the artificial neural network of the VGG-16 model using low computation amount quantization, the number of bits of the high computation amount layers among the plurality of layers of the artificial neural network is relatively reduced. For example, the number of bits of the sixth layer and the seventh layer is reduced to 6 and 5 bits, respectively, while the number of bits of the first layer is reduced to 13 bits. As such, when the low computation amount quantization was applied to the layers of the artificial neural network in order of computation amount, the reduction rate of the computation amount of the entire artificial neural network was calculated as 49.11%.

Hereinafter, hardware implementation examples of an artificial neural network to which bit quantization is applied according to various embodiments of the present disclosure described above will be described in detail. When a convolutional artificial neural network including a plurality of layers is implemented in hardware, the weight kernel may be arranged outside and/or inside a processing unit for performing convolution of the convolutional layers.

In one embodiment, the weight kernel may be stored in a memory, for example, register, buffer, cache, and the like, separated from a processing unit for performing convolution of the convolutional layer. In this case, after bit quantization is applied to the weight kernel to reduce the number of bits of element values of the weight kernel, the size of the memory may be determined according to the number of bits of the weight kernel. In addition, the bit width of multipliers or adders arranged in the processing unit that performs multiplication and/or addition operations by receiving the element values of the weight kernel stored in the memory and the element values of the input feature map, may also be designed according to the number of bits according to the result of bit quantization.

In another embodiment, the weight kernel may be implemented in a hard-wired form in a processing unit for performing convolution of the convolutional layer. In this case, after bit quantization is applied to the weight kernel to reduce the number of bits of the element values of the weight kernel, a hard-wire representing each of the element values of the weight kernel can be implemented in the processing unit according to the number of bits of the weight kernel. In addition, the bit size of a multiplier or an adder arranged in the processing unit that performs multiplication and/or addition operations by receiving the element values of the hard-wired weight kernel and the element values of the input feature map, may also be designed according to the number of bits resulting from the bit quantization.

Figure 19:
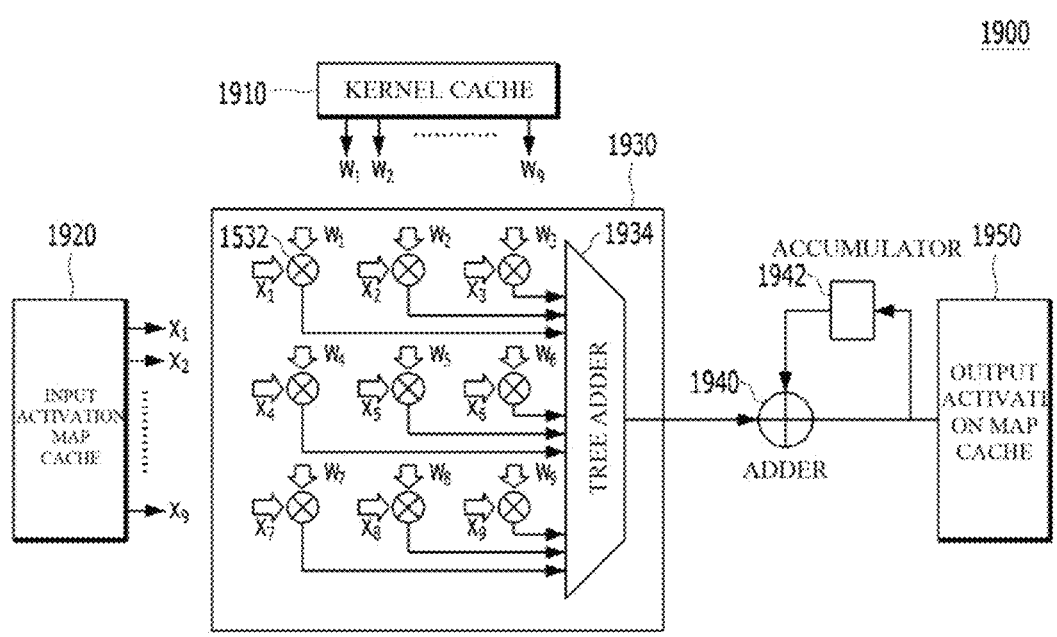
FIG. 19 is a diagram illustrating an example of hardware implementation of an artificial neural network according to an embodiment of the present disclosure.
Figure 20:
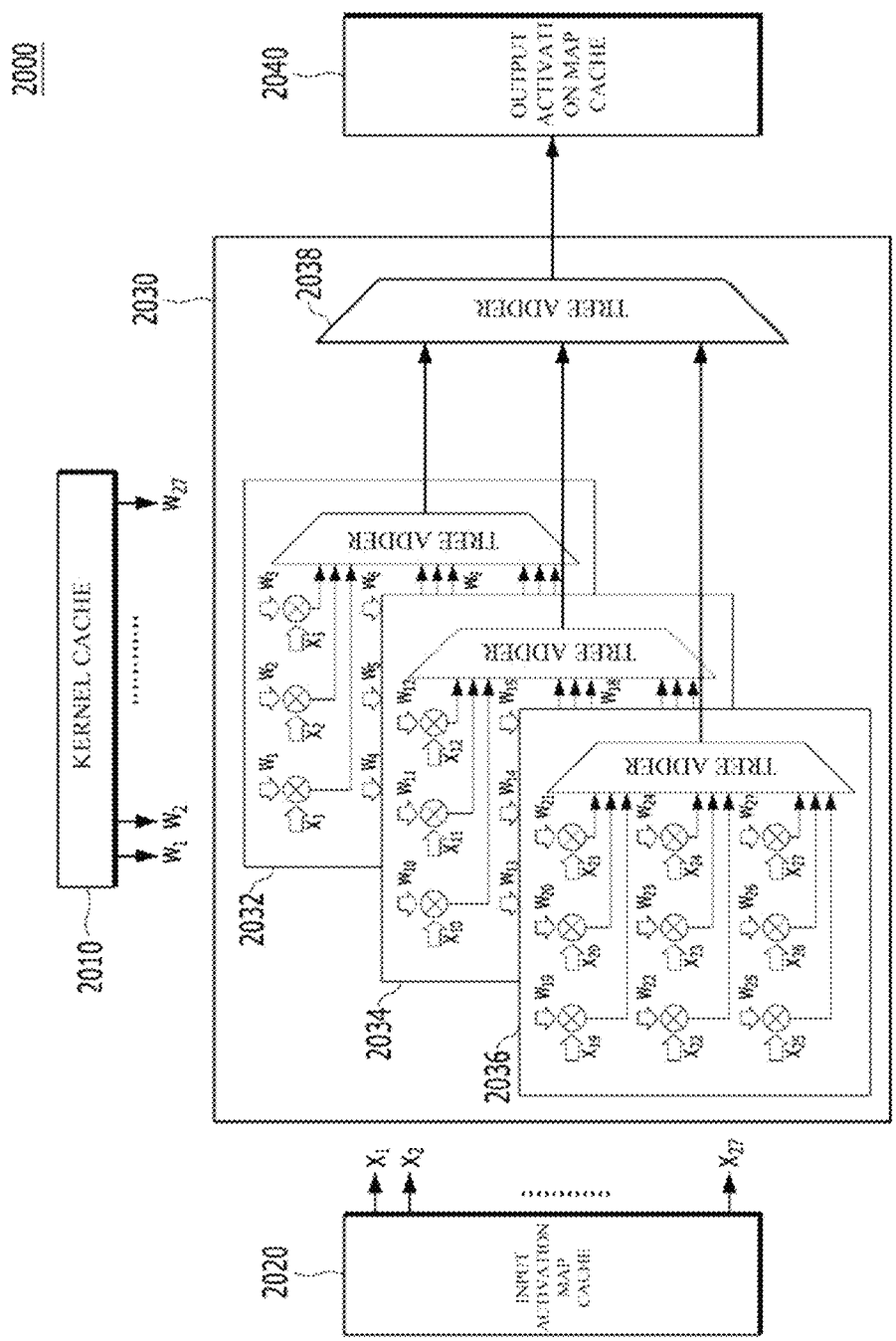
FIG. 20 is a diagram illustrating an example of hardware implementation of an artificial neural network according to another embodiment of the present disclosure.
Figure 21:
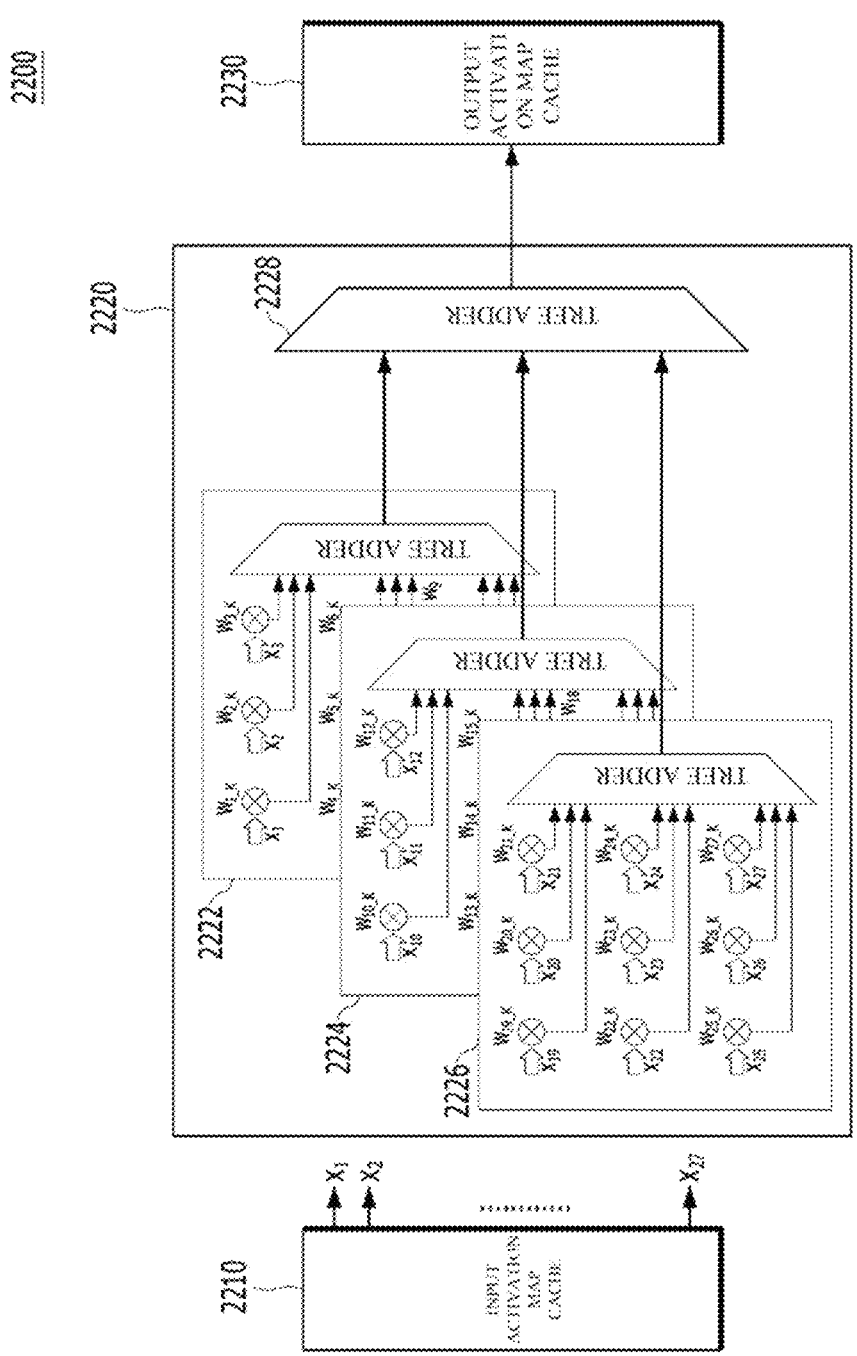
FIG. 21 is a diagram illustrating an example of hardware implementation of an artificial neural network according to the other embodiment of the present disclosure.

FIGS. 19 to 21 described below are diagrams illustrating an example of hardware implementation of an artificial neural network including a plurality of layers according to the other embodiment of the present disclosure. The method and system for bit quantization of an artificial neural network including a plurality of layers according to the present disclosure can reduce a required amount of computation, a bit size of an operator, and a memory by applying the present disclosure to any artificial neural network (ANN) computing system such as CPU, GPU, FPGA, and ASIC. In addition, in the present example, an embodiment has been shown based on an integer, but a floating point operation may also be performed.

FIG. 19 is a diagram illustrating an example of hardware implementation of an artificial neural network according to an embodiment of the present disclosure. The illustrated artificial neural network shows an example in which the convolutional multiplication processing apparatus 1900 of the convolutional layer of the convolutional artificial neural network is implemented in hardware. Here, the convolutional layer will be described on the assumption that convolution is performed by applying a weight kernel having a size of 3×3×3 to a part of the input feature map, i.e., data of a size of 3×3×3. The size and number of weight kernels of each layer may differ depending on the application field and the number of input/output feature map channels.

As illustrated, the weight kernel may be stored in a weight kernel cache 1910 that is separate from the processing unit 1930 for executing convolution of the convolutional layer. In this case, after applying bit quantization to the weight kernel to reduce the number of bits of the element values (w 1, w 2, . . . , w 9) of the weighting kernel, the size of the cache can be determined according to the number of bits of the weight kernel. In addition, the bit size of the multiplier or adder arranged in the processing unit 1930 that receives the element values of the weight kernel stored in the memory and the element values of the input feature map and performs multiplication and/or addition operations, may also be designed according to the number of bits of the weight kernel element value resulting from the bit quantization.

According to an embodiment, the input feature map cache 1920 may receive and store a portion of the input data, i.e., a portion corresponding to the size of the weight kernel. The weight kernel traverses the input data, and the input feature map cache 1920 may sequentially receive and store a portion of the input data corresponding to the location of the weight kernel. A portion of the input data (x 1, x 2, . . . , x 9) stored in the input feature map cache 1920 and some element values of the weight kernel stored in the weight kernel cache 1910 (w 1, w 2, . . . , w 9) are respectively input to a corresponding multiplier 1932 to perform elementwise multiplication. The result values of the elementwise multiplication by the multiplier 1932 are summed by the tree adder

1934 and input to the adder 1940. When the input data is composed of multiple channels, for example, when the input data is an RGB color image, the adder 1940 may add the value stored in the accumulator 1942, the initial value is 0, and the sum value of the input specific channel and store it in the accumulator 1942 again. The sum value stored in the accumulator 1942 may be input to the accumulator 1942 by adding it back to the sum value of the adder 1940 for the next channel. The summing process of the adder 1940 and the accumulator 1942 is performed for all channels of input data, and the total sum value may be input to the output activation map cache 1950. The procedure of convolution described above may be repeated for a weight kernel and a portion of input data corresponding to a traversing position on the input data of the weight kernel.

As described above, when the element values of the weight kernel are stored in the weight kernel cache 1910 arranged outside the processing unit 1930, the number of bits of the weight kernel element values can be reduced by bit quantization according to the present disclosure. Accordingly, the size of the weight kernel cache 1910 and the size of the multiplier and adder of the processing unit 1930 can be reduced. Further, as the size of the processing unit 1930 decreases, the computational speed and power consumption of the processing unit 1930 may also decrease.

FIG. 20 is a diagram illustrating an example of hardware implementation of an artificial neural network according to another embodiment of the present disclosure.

The illustrated artificial neural network shows an example of implementing the convolutional multiplication processing apparatus 2000 of the convolutional layer of the convolutional artificial neural network in hardware. Here, the convolutional layer performs convolution by applying a weight kernel having a size of 3×3×3 to a portion, i.e., data of a size of 3×3×3, on the input activation map.

As shown, the weight kernel may be stored in a weight kernel cache 2010 separate from the processing unit 2030 for executing convolution of the convolutional layer. In this case, after bit quantization is applied to the weight kernel, the number of bits of the element values of the weight kernel (w 1, w 2, . . . , w 9) is reduced, and then the size of the cache may be determined according to the number of bits of the weight kernel. In addition, the bit size of the multiplier or adder arranged in the processing unit 2030 that receives the element values of the weight kernel stored in the memory and the element values of the input activation map or feature map and performs multiplication and/or addition operations, may also be designed according to the number of bits of the weight kernel element value resulting from the bit quantization.

According to an embodiment, the input activation map cache 2020 may receive and store a portion, i.e., a portion corresponding to the size of a weight kernel, on input data configured of multiple channels, e.g., three RGB channels. The weight kernel traverses the input data, and the input activation map cache 2020 may sequentially receive and store a portion of the input data corresponding to the location of the weight kernel. A portion of the input data (x 1, x 2, . . . , x 27) stored in the input activation map cache 2020 and the element values of the weight kernel (w 1, w 2, . . . , w 27) stored in the weight kernel cache 2010 are each input to a corresponding multiplier to perform elementwise multiplication. At this time, kernel element values (w 1, w 2, . . . , w 9) of the weight kernel cache 2010 and a portion of the first channel of input data (x 1, x 2, . . . , x 9) stored in the input activation map weight cache 2020 are input to the first convolution processing unit 2032. In addition, weight kernel element values (w 10, w 11, . . . w 18) of the weight kernel cache 2010 and a portion of the second channel of input data (x 10, x 11, . . . x 18) stored in the input activation map cache 2020 are input to the second convolution processing unit 2034. In addition, weight kernel element values (w 19, w 20, . . . , w 27) of the weight kernel cache 2010 and a portion of the third channel of input data (x 10, x 11, . . . x 18) stored in the input activation map cache 2020 are input to the third convolution processing unit 2036.

Each of the first convolution processing unit 2032, the second convolution processing unit 2034, and the third convolution processing unit 2036 may operate in the same manner as the processing unit 1930 illustrated in FIG. 19. The result value of the convolution calculated by each of the first convolution processing unit 2032, the second convolution processing unit 2034, and the third convolution processing unit 2036 may be summed by the tree adder 2038 and input to the output activation map cache 2040.

As described above, when the element values of the weight kernel are stored in the weight kernel cache 2010 arranged outside the processing unit 2030, the number of bits of the weight kernel element values may be reduced by bit quantization according to the present disclosure. Accordingly, the size of the weight kernel cache 2010 and the size of the multiplier and the adder of the processing unit 2030 can be reduced. Further, as the size of the processing unit 2030 decreases, the computational speed and power consumption of the processing unit 2030 may also decrease.

FIG. 21 is a diagram illustrating an example of hardware implementation of an artificial neural network according to the other embodiment of the present disclosure.

The illustrated artificial neural network shows an example of implementing the convolutional multiplication processing apparatus 2200 of the convolutional layer of the convolutional artificial neural network in hardware. Here, the convolutional layer performs convolution by applying a weight kernel having a size of 3×3×3 to a portion, i.e., data of a size of 3×3×3, on the input activation map.

As shown, the weight kernel may be implemented in a hardwired form in the processing unit 2220 for executing convolution of the convolutional layer. In this case, after bit quantization is applied to the weight kernel to reduce the number of bits of the element values of the weight kernel (w 1_K, w 2_K, w 27_K), the size of the cache may be determined according to the number of bits of the weight kernel. In addition, the bit size of the multiplier or adder arranged in the processing unit 2030 that receives the element values of the weight kernel implemented as wires in the processing unit 2220 and the element values of the input activation map or feature map and performs multiplication and/or addition operations, may also be designed according to the number of bits of the weight kernel element value resulting from the bit quantization.

According to an embodiment, the input activation map cache 2210 may receive and store a portion, a portion corresponding to the size of a weight kernel, on input data composed of multiple channels, e.g., three RGB channels. The weight kernel traverses the input data, and the input activation map cache 2210 may sequentially receive and store a portion of input data corresponding to the location of the weight kernel. A portion of the input data (x 1, x 2, . . . , x 27) stored in the input activation map cache 2210 and the element values of the weight kernel (w 1_K, w 2_K, w 27_K) implemented as wires in the processing unit 2220 are respectively input to a corresponding multiplier to perform elementwise multiplication. In this case, the weight kernel element values (w 1_K, w 2_K, w 9_K) implemented as wires in the processing unit 2220 and a portion of the first channel of the input data (x 1, x 2, . . . , x 9) stored in the input activation map cache 2210 are input to the first convolution processing unit 2222. In addition, weight kernel element values implemented as wires in the processing unit 2220 and a portion of the second channel of the input data stored in the input activation map cache 2210 are input to the second convolution processing unit 2224. In addition, the weight kernel element values (w 19_K, w 20_K, w 27_K) of the weight kernel cache 2210 and a portion of the third channel of input data (x 19, x 20, . . . , x 27) stored in the input activation map cache 2210 are input to the third convolution processing unit 2226.

The result of the convolution calculated by each of the first convolution processing unit 2222, the second convolution processing unit 2224 and the third convolution processing unit 2226 may be summed by the tree adder 2228 and input to the output activation map cache 2230.

As described above, when the element values of the weight kernel are implemented in a hardwired form in the processing unit 2220, the number of bits of the weight kernel element values may be reduced by bit quantization according to the present disclosure. Accordingly, there is an effect of reducing the number of wires implemented therein and the size of the multiplier and adder of the processing unit 2220. Also, as the size of the processing unit 2220 decreases, the computational speed and power consumption of the processing unit 2220 may also decrease.

Figure 22:
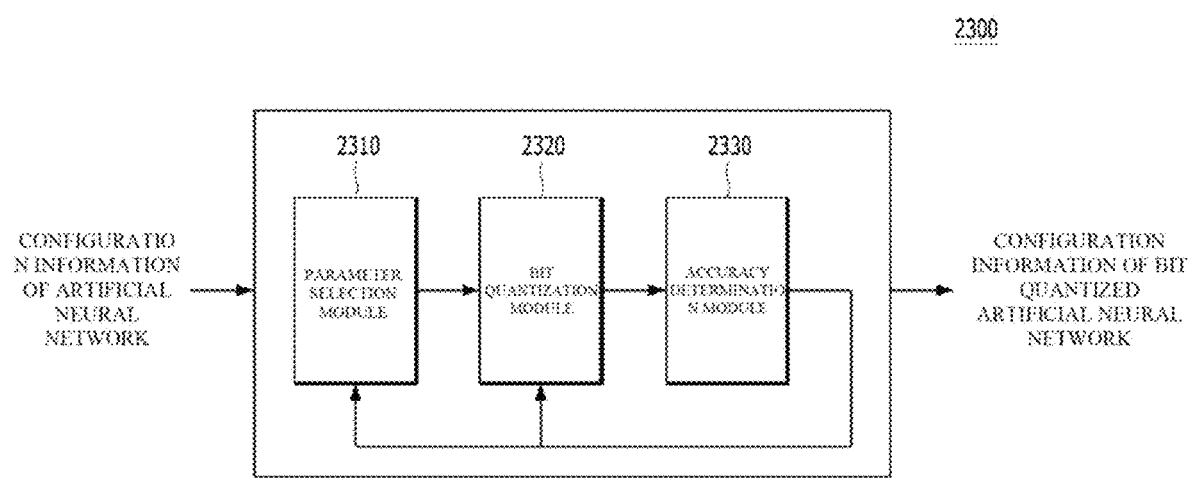
FIG. 22 is a diagram illustrating a configuration of a system for performing bit quantization on an artificial neural network according to an embodiment of the present disclosure.

FIG. 22 is a diagram illustrating a configuration of a system for performing bit quantization on an artificial neural network according to an embodiment of the present disclosure.

As shown, the system 2300 may include a parameter selection module 2310, a bit quantization module 2320, and an accuracy determination module 2330. The parameter selection module 2310 may analyze configuration information of input artificial neural network. The configuration information of the artificial neural network may include the number of layers included in the artificial neural network, the function and role of each layer, information about the input/output data of each layer, the type and number of multiplications and additions performed by each layer, the type of activation function executed by each layer, the type and configuration of the weight kernel into which each layer is input, the size and number of weight kernels in each layer, the size of the output feature map, the initial value of the weight kernel, e.g., element values of the weight kernel set by mistake, and the like, but it is not limited thereto. The configuration information of the artificial neural network may include information on various elements according to the type of the artificial neural network, e.g., convolution artificial neural network, recurrent artificial neural network, multilayer perceptron, and the like.

The parameter selection module 2310 may select at least one parameter to be quantized or a parameter group from the artificial neural network with reference to the input artificial neural network configuration information. How to select one parameter or data or a parameter group in the artificial neural network may be determined according to the influence of the parameter to be selected on the overall performance or the amount of computation or the amount of resources required for hardware implementation of the artificial neural network. The selection of a parameter may be performed by selecting one among one weight, one feature map and activation map, one weight kernel, all weights in one layer, all feature maps in one layer or activation map.

In an embodiment, in the case of the convolutional artificial neural network (CNN) 400 described with reference to FIGS. 4 to 10 described above, since the convolutional layer 420 and/or the fully connected layer 440 has a large effect on the overall performance or computational amount of the CNN 400, the weight kernel or the feature map/activation map of at least one of these layers 420 and 440 may be selected as one parameter to be quantized.

In an embodiment, at least one of a plurality of layers included in the artificial neural network may be selected and all weight kernels in the layer or all activation map data of the layer may be set as one parameter group. The selection method may be determined according to the influence of the selected layer on the overall performance or computational amount of the artificial neural network, but is not limited thereto, and may include one among various methods. For example, selection of at least one layer among a plurality of layers included in the artificial neural network may be executed according to (i) a method of sequentially selecting a layer from the first layer to which the input data is received to subsequent layers according to the arrangement order of the plurality of layers configuring the artificial neural network, (ii) a method of sequentially selecting the last layer from which the final output data is generated to the previous layer according to the arrangement order of the plurality of layers configuring the artificial neural network, (iii) a method of selecting from a layer with the highest computational amount among a plurality of layers configuring the artificial neural network, or (iv) a method of selecting from a layer with the least computational amount among the plurality of layers configuring the artificial neural network.

When the selection of the data target for quantization of the artificial neural network is completed by the parameter selection module 2310, information of the selected data is input to the bit quantization module 2320. The bit quantization module 2320 may reduce the data representation size for the corresponding parameter to a unit of bits by referring to the input information of the selected parameter. The resource required for the operation of the selected parameter may include a memory for storing the selected parameter or a data path for transmitting the selected parameter, but is not limited thereto.

In an embodiment, when the bit quantization module 2320 reduces the data size of the selected parameter to a unit of bits, the weight kernel quantization and/or activation map quantization described with reference to FIGS. 4 to 13 may be performed.

When the bit quantization module 2320 completes bit quantization for the selected parameter, it transmits the bit quantized artificial neural network information to the accuracy determination module 2330. The accuracy determination module 2330 may reflect the bit quantized artificial neural network information in the configuration information of the artificial neural network input to the system 2300. The bit quantization module 2320 may determine whether the accuracy of the artificial neural network is greater than or equal to a predetermined target value based on the configuration information of the artificial neural network in which the bit quantized artificial neural network information is reflected. For example, after decreasing the size representing the data of the parameter selected in the artificial neural network to a unit of bits, if the accuracy of the output result of the artificial neural network, for example, the inference result of the artificial neural network, is more than a predetermined target value, the accuracy determination module 2330 may predict that the overall performance of the artificial neural network can be maintained even when additional bit quantization is performed.

Therefore, when the accuracy determination module 2330 determines that the accuracy of the artificial neural network is greater than or equal to the target value, a control signal is transmitted to the parameter selection module 2310 so that the parameter selection module 2310 selects another parameter or parameter group included in the artificial neural network. Here, the method of selecting one parameter in the artificial neural network may be executed according to (i) a method of sequentially selecting the next parameter of the previously selected parameter according to the arrangement order of each parameter or parameter group configuring the artificial neural network ("forward bit quantization"), (ii) a method of selecting the previous parameter of the previously selected parameter in the backward direction according to the order of arrangement of parameters or parameter groups configuring the artificial neural network ("backward bit quantization"), (iii) a method of selecting a parameter with the larger amount of computation after the previously selected parameter according to the order of the amount of computation among a plurality of parameters configuring the artificial neural network ("High computational cost bit quantization"), or (iv) a method of selecting a parameter with a smaller amount of computation after the previously selected parameter according to the order of the amount of computation among a plurality of parameters configuring the artificial neural network ("Low computational cost bit quantization").

On the other hand, if the accuracy determination module 2330 determines that the accuracy of the artificial neural network is not greater than or equal to the target value, it may determine that the accuracy of the artificial neural network is degraded due to bit quantization performed on the currently selected parameter. Therefore, in this case, the number of bits determined by the bit quantization performed immediately before can be determined as the final number of bits. In one embodiment, the accuracy of the artificial neural network may mean a probability that the artificial neural network will present the correct answer to the problem in the inference step after learning a solution to a given problem, for example, recognition of an object included in an image as input data. In addition, the target value used in the bit quantization method described above may be expressed with a minimum accuracy to be maintained after bit quantization of the artificial neural network. For example, assuming that the threshold is 90%, additional bit quantization can be performed if the accuracy of the artificial neural network is 90% or more even after reducing the memory size for storing the parameters of the layer selected by bit quantization to a unit of bits. For example, after performing the first bit quantization, if the accuracy of the artificial neural network is measured to be 94%, then additional bit quantization can be performed. After performing the second bit quantization, if the accuracy of the artificial neural network is measured to be 88%, then the result of the currently executed bit quantization may be ignored and the number of data representation in bits determined by the first bit quantization can be determined as the final bit quantization result.

In one embodiment, according to a computational cost bit quantization method, when selecting a parameter or parameter group to perform bit quantization based on an amount of computation, the amount of computation of each parameter may be determined as follows. That is, when the sum of n bits and m bits is performed in a specific operation of the artificial neural network, the amount of calculation of the corresponding operation is calculated as (n+m)/2. In addition, when multiplying n bits and m bits in a specific operation of the artificial neural network, the amount of operation for the corresponding operation may be calculated as n×m. Accordingly, the amount of calculation for a specific parameter of the artificial neural network may be a result of summing all the calculation amounts of addition and multiplication performed on the parameter.

In this bit quantization, a method of selecting a specific parameter or parameter group can be selected as weight data or feature map and activation map data belonging to each layer, or each weight kernel belonging to one layer, or an individual parameter group of each weight data in one weight kernel.

For reference, the elements shown in FIG. 22 according to an embodiment of the present disclosure may be implemented as software or hardware elements such as field programmable gate array (FPGA) or application specific integrated circuit (ASIC).

However, 'elements' are not meant to be limited to software or hardware, and each element may be configured to be in an addressable storage medium or may be configured to play one or more processors.

Thus, as an example, the element includes elements such as software elements, object-oriented software elements, class elements and task elements, and processes, functions, properties, procedures, sub-routines, segments of program code, drivers, firmware, microcode, circuits, data, databases, data structures, tables, arrays, and variables.

The elements and the functions provided within the elements can be combined into a smaller number of elements or further divided into additional elements.

Embodiments of the present disclosure may also be implemented in the form of a recording medium including instructions executable by a computer, such as a program module executed by a computer. Computer-readable medium can be any available media that can be accessed by a computer, and includes both volatile and nonvolatile media, removable and non-removable media. Further, the computer-readable medium may include both computer storage medium and communication medium. Computer storage medium includes both volatile and nonvolatile, removable and non-removable medium implemented in any method or technology for storage of information such as computer readable instructions, data structures, program modules or other data. Communication medium typically includes computer readable instructions, data structures, program modules, or other data in a modulated data signal such as a carrier wave, or other transmission mechanism, and includes any information delivery medium.

Although the present disclosure has been described in connection with some embodiments herein, it should be understood that various modifications and changes can be made without departing from the scope of the present disclosure as understood by those skilled in the art to which the present disclosure belongs. In addition, such modifications and changes should be considered to fall within the scope of the claims appended to this specification.

[National R&D project that supported this invention]
[Task identification number] 1711117015
[Task number] 2020-0-01297-001
[Ministry Name] Ministry of Science and Technology Information and Communication
[Name of project management (professional) institution] Information and Communication Planning and Evaluation Agency

[Research project name] Next-generation intelligent semiconductor technology development (design) (R&D)
[Research Title] Advanced Data Reuse Development of Deep Learning Processor Technology for Ultra-low Power Edge
[Contribution rate] 1/1
[Name of project execution organization] DEEPX CO., LTD.
[Research Period] 2020 Apr. 01~2020 Dec. 31

The invention claimed is:

1. A method for quantizing bits of an artificial neural network of a multi-layer structure performed by a system, the method comprising:
    calculating a computation amount for each of a plurality of layers of the artificial neural network of the multi-layer structure;
    selecting at least one layer in descending order of computation amount for a layer, among the plurality of layers;
    bit quantizing to reduce a size of a data representation for a parameter of the selected at least one layer to a unit of bits;
    after the bit quantization, determining whether an accuracy of the artificial neural network of the multi-layer structure is greater than or equal to a target value; and
    repeatedly executing the bit quantizing when the accuracy of the artificial neural network of the multi-layer structure is greater than or equal to the target value.

2. The method of claim 1, further comprising:
    determining the size of a data representation for a parameter of the selected at least one layer that satisfies the accuracy greater than the target value as a final number of bits for the parameter of the selected at least one layer, when the accuracy of the artificial neural network of the multi-layer structure is smaller than the target value.

3. The method of claim 2, further comprising:
    determining a final number of bits of the selected at least one layer in which the final number of bits is not determined by repeatedly executing the bit quantizing.

4. The method of claim 1, wherein the bit quantizing to reduce the size of the data representation to the unit of bits is configured to reduce the size of the data representation to one-bit unit.

5. The method of claim 1, wherein the parameter of the selected at least one layer is one of weight data, feature map data, or activation map data.

6. The method of claim 1, wherein the bit quantizing is for reducing storing size of at least one memory of buffer memory, register memory or cache memory configured to store parameters of the selected at least one layer.

7. The method of claim 1, wherein a number of bits of a multiplier and an adder of a processing unit that processes the bit quantized artificial neural network of the multi-layer structure is designed to correspond to a number of bits according to results of the bit quantizing.

8. A method for quantizing bits of an artificial neural network of a multi-layer structure performed by a system including a processor, the method comprising:
    calculating by the processor, a computation amount for each layer of the artificial neural network of the multi-layer structure;
    selecting by the processor, weight data of a layer in descending or ascending order of weight data of a layer with the computation amount;
    bit quantizing by the processor, to reduce a size of a data representation for the selected weight data to a unit of bits;
    after the bit quantization, determining by the processor, whether an accuracy of the artificial neural network of the multi-layer structure is greater than or equal to a target value; and
    repeatedly executing by the processor, the bit quantizing when the accuracy of the artificial neural network of the multi-layer structure is greater than or equal to the target value.

9. The method of claim 8, further comprising determining the size of the data representation for the selected weight data that satisfies the accuracy greater than the target value as a final number of bits for the selected weight data, when the accuracy of the artificial neural network of the multi-layer structure is smaller than the target value.

10. The method of claim 9, further comprising:
    selecting the weight data which the final number of bits for the weight data is not determined; and
    determining a final number of bits of the selected weight data which the final number of bits is not determined by repeatedly executing the bit quantizing.

11. The method of claim 8, the bit quantizing to reduce the size of the data representation to the unit of bits is configured to reduce the size of the data representation at least by one-bit unit.

12. The method of claim 8, wherein the bit quantizing is for reducing storing size of at least one memory of buffer memory, register memory or cache memory configured to store the selected weight data.

13. The method of claim 8, wherein a number of bits of a multiplier and an adder of a processing unit that processes the bit quantized artificial neural network of the multi-layer structure is designed to correspond to a number of bits according to results of the bit quantizing.

* * * * *